United States Patent
Jin et al.

(10) Patent No.: US 11,815,461 B2
(45) Date of Patent: *Nov. 14, 2023

(54) PORTABLE PLANT HEALTH ANALYSIS SYSTEM AND METHOD

(71) Applicant: Purdue Research Foundation, West Lafayette, IN (US)

(72) Inventors: Jian Jin, West Lafayette, IN (US); Xiaohui Song, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/080,709

(22) Filed: Dec. 13, 2022

(65) Prior Publication Data
US 2023/0112059 A1 Apr. 13, 2023

Related U.S. Application Data

(63) Continuation of application No. 16/658,838, filed on Oct. 21, 2019, now Pat. No. 11,536,663, which is a
(Continued)

(51) Int. Cl.
| | |
|---|---|
| *G01N 21/64* | (2006.01) |
| *H04N 23/51* | (2023.01) |
| *H04N 25/76* | (2023.01) |
| *H04N 23/56* | (2023.01) |
| *H04N 23/57* | (2023.01) |

(Continued)

(52) U.S. Cl.
CPC ..... *G01N 21/6486* (2013.01); *G01N 21/6456* (2013.01); *G01N 21/84* (2013.01); *H04N 23/51* (2023.01); *H04N 23/56* (2023.01); *H04N 23/57* (2023.01); *H04N 25/71* (2023.01); *H04N 25/76* (2023.01); *G01N 2021/8466* (2013.01); *G01N 2201/0221* (2013.01)

(58) Field of Classification Search
CPC .......... G01N 21/6486; G01N 21/6456; G01N 21/84; G01N 2021/8466; G01N 2201/0221; H04N 23/51; H04N 23/56; H04N 23/57; H04N 25/71; H04N 25/76

See application file for complete search history.

(56) References Cited

U.S. PATENT DOCUMENTS

| | | | |
|---|---|---|---|
| 2003/0112430 A1* | 6/2003 | Lindner | G01N 21/9054 356/239.4 |
| 2010/0111369 A1* | 5/2010 | Lussier | G01N 21/6486 356/417 |

* cited by examiner

*Primary Examiner* — Yogesh K Aggarwal
(74) *Attorney, Agent, or Firm* — Piroozi-IP, LLC

(57) ABSTRACT

A portable apparatus for analyzing a plant specimen. A housing assembly defines a sensing volume and controls entry of ambient light into the sensing volume when the housing is closed. A specimen support positions a plant specimen within the sensing volume whereby light emitted from at least one light emitter is incident upon the plant specimen. An image sensor senses light from the at least one light emitter that has been incident on the plant specimen. A processor analyzes data obtained from the light sensor to assess one or more properties of the plant specimen. There may be more than one light emitter, e.g., a halogen lamp and LED array, and the apparatus may acquire images under more than one lighting condition. The apparatus may include a mechanism for moving the plant specimen relative to the optical path to take images at multiple regions of interest on the specimen.

10 Claims, 17 Drawing Sheets

Related U.S. Application Data continuation of application No. PCT/US2018/027953, filed on Apr. 17, 2018.

(60) Provisional application No. 62/546,699, filed on Aug. 17, 2017, provisional application No. 62/487,015, filed on Apr. 19, 2017.

(51) Int. Cl.
*H04N 25/71* (2023.01)
*G01N 21/84* (2006.01)

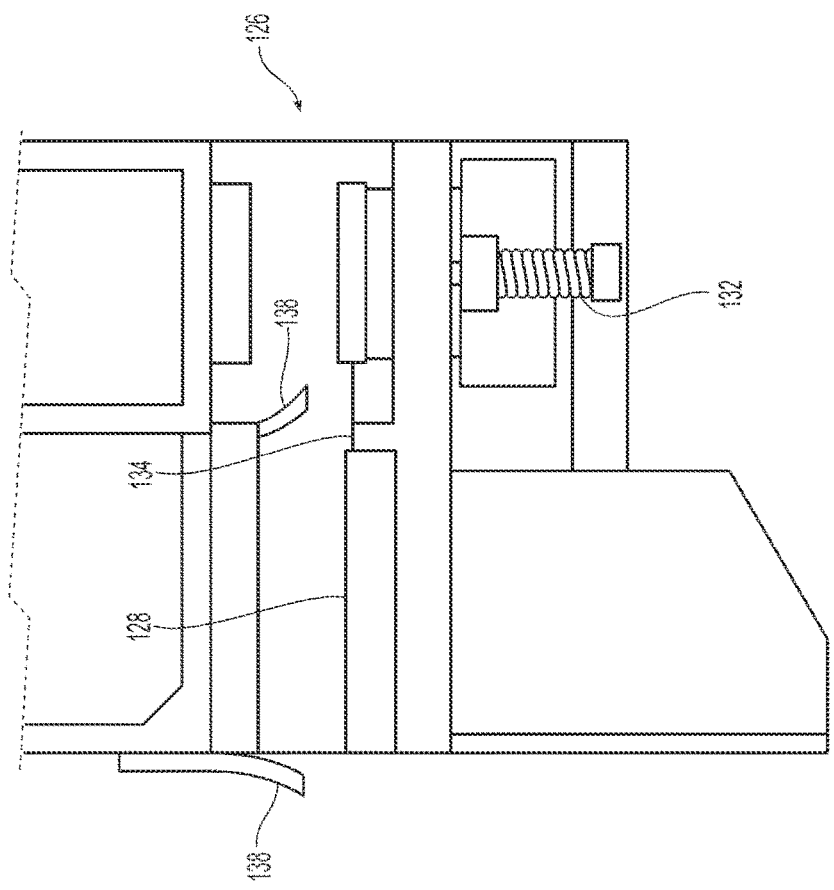
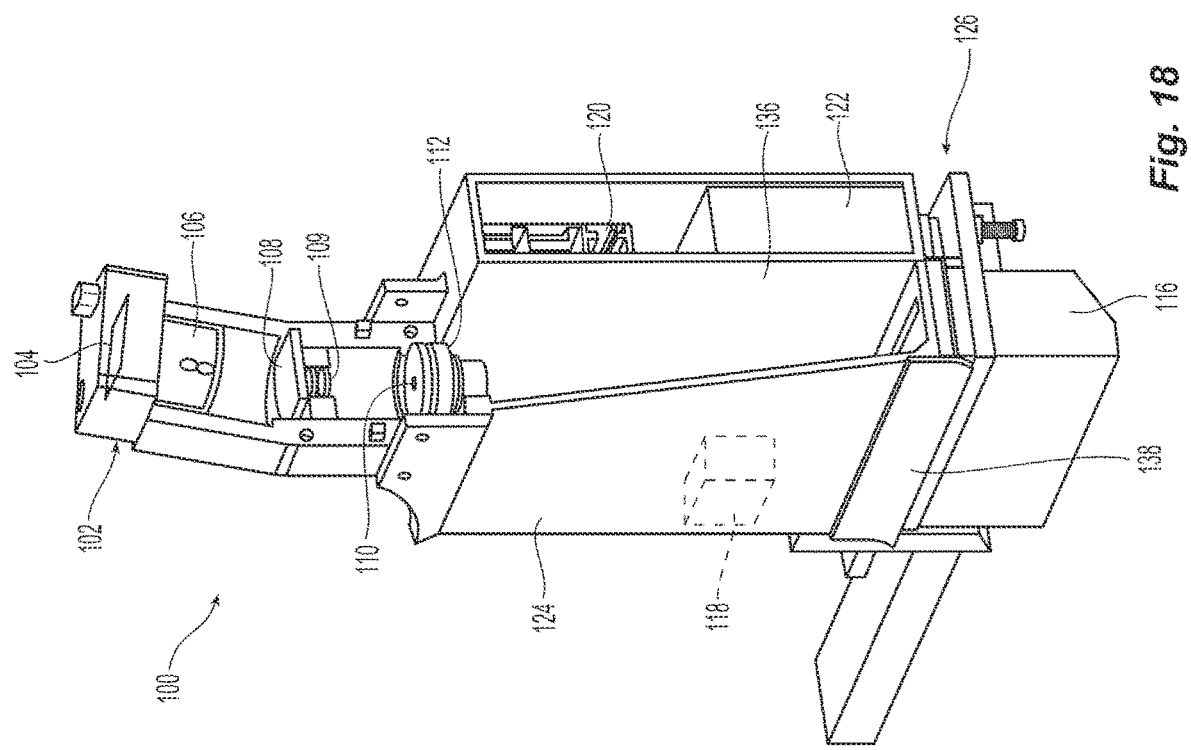

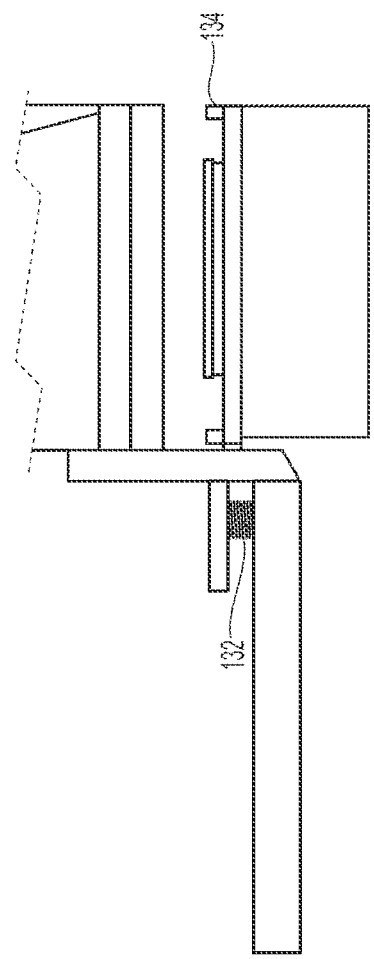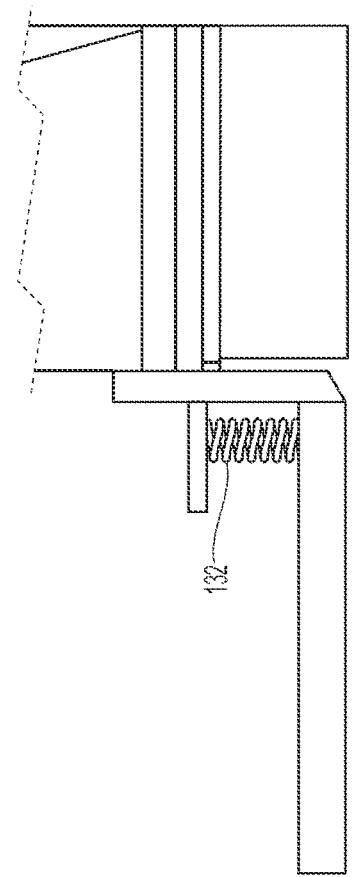

PORTABLE PLANT HEALTH ANALYSIS SYSTEM AND METHOD

CROSS REFERENCE TO RELATED APPLICATIONS

This application is a continuation application of U.S. application Ser. No. 16/658,838, filed Oct. 21, 2019 now U.S. Pat. No. 11,536,663 to Jin et al., which is a continuation application of international application PCT/US18/27953, filed Apr. 17, 2018, which claims priority from provisional application 62/546,699 filed Aug. 17, 2017, and which also claims priority from provisional application 62/487,015 filed Apr. 19, 2017, contents of each of which is incorporated herein by reference in its entirety into the present disclosure.

BACKGROUND

1. Technical Field

The present application relates to apparatus and systems useful in analyzing plant health.

2. Description of the Related Art

The research community has developed and begun using a variety of technologies for plant phenotyping over the last decade. These technologies, however, are mainly directed toward research oriented users working in academia and agricultural industries which have significant resources to fund the use of technology.

These new technologies have generally not been adopted by farmers who are involved in growing agricultural crops for consumption and the market. While many of the newly developed technologies used in the research community hold promise for such farmers, most farmers continue to rely on traditional methods of assessing the health of their crops.

SUMMARY

The present invention provides a portable system for assessing plant health that is well-suited for use by individual farmers to assess the health of their crops. The system may employ hyperspectral imaging of fluorescence, transmittance and/or reflectance to assess the health of a plant specimen.

The invention comprises, in a first embodiment thereof, a portable apparatus for analyzing a plant specimen. The apparatus includes a housing assembly adapted to be carried between locations by a person, the housing assembly having a closed configuration wherein the housing assembly defines a sensing volume. The housing assembly controls entry of ambient light into the sensing volume when in the closed configuration. At least one light emitter is supported by the housing and positioned to emit light within the sensing volume when the housing is in a closed configuration. A specimen support is coupled with the housing wherein the specimen support positions the plant specimen within the sensing volume whereby light emitted from the at least one light emitter is incident upon the plant specimen when the housing is in a closed configuration. An image sensor is positioned to sense light within the sensing volume that has been emitted from the at least one light emitter and incident on the plant specimen. A processor is operably coupled with the at least one light emitter and the image sensor to control operation of the apparatus whereby image data captured by the image sensor is obtained to assess one or more properties of the plant specimen.

In a second embodiment, the apparatus of the first embodiment is configured to acquire images with the image sensor under a plurality of different lighting conditions.

In a third embodiment, the at least one light emitter of the second embodiment includes a halogen light source, a laser light source emitting light in the range of 400 to 410 nm, or an LED array emitting light within the range of 350 to 480 nm.

In a fourth embodiment, the at least one light emitter of the second embodiment includes two different light emitters selected from the group including a halogen light source, a laser light source emitting light in the range of 400 to 410 nm, and an LED array emitting light within the range of 350 to 480 nm.

In a fifth embodiment, the at least one light emitter of the second embodiment includes at least one halogen light source, at least one laser light source emitting light in the range of 400 to 410 nm, and an LED array emitting light within the range of 350 to 480 nm.

In a sixth embodiment, the apparatus of the fifth embodiment is configured to capture a hyperspectral reflectance image, a hyperspectral transmittance image and a fluorescent image of a region of interest on the plant specimen in a single imaging sequence.

In a seventh embodiment, the apparatus of the sixth embodiment is configured such that, when the housing is in the closed configuration, the specimen support is positioned between the image sensor and a first halogen light source whereby the image sensor can capture a hyperspectral transmittance image from light transmitted through the plant specimen which has been emitted from the first halogen light source and wherein a second halogen light source, the laser light source and the LED array are positioned between the specimen support and the image sensor whereby the image sensor can capture a hyperspectral reflectance image and a fluorescent image from light emitted from at least one of the second halogen light source, the laser light source and the LED array and reflected by the plant specimen.

In an eighth embodiment, the apparatus may take the form of any one of embodiments 1 through 7 wherein the image sensor is a CMOS sensor or a CCD sensor.

In a ninth embodiment, the apparatus may take the form of any one of embodiments 1 through 7 wherein the specimen support, the at least one light emitter and the image sensor are all fixed relative to the housing assembly when the housing assembly is in the closed configuration.

In a tenth embodiment, the apparatus of the ninth embodiment is configured such that the housing includes a main body section and a pivotal section wherein the pivotal section pivots relative to the main body between an open position providing access to the sensing volume and a closed position wherein the housing is in the closed configuration and wherein the specimen support is defined by engagement between the pivotal section and the main body.

In an eleventh embodiment, the apparatus of any one of embodiments 1 through 7 is configured such that the light emitted from the at least one light emitter and incident on the plant specimen that is sensed by image sensor defines an optical path from the light emitter to the image sensor, wherein the apparatus includes a plurality of optical components interacting with the light defining the optical path and wherein the at least one light emitter and the image sensor each define one of the plurality of optical components; and wherein a plant specimen engaged by the specimen support is movable relative to at least one of the plurality of optical components in the optical path.

In a twelfth embodiment, the apparatus of the eleventh embodiment is configured such that the image sensor is adapted to acquire images under a plurality of different lighting conditions and wherein the apparatus is configured to move the plant specimen relative to at least one of the plurality of optical components in the optical path to thereby define a plurality of different regions of interest viewable by the image sensor on the plant specimen and wherein the apparatus is configured to acquire, at each region of interest, a plurality of images wherein each of the plurality of images is subject to different lighting conditions.

In a thirteenth embodiment, the apparatus of the twelfth embodiment is configured such that the apparatus further includes a specimen position sensor configured to obtain positional information on the plant specimen for each of the plurality of regions of interest and wherein the positional information is communicated to the processor.

In a fourteenth embodiment, the apparatus of the thirteenth embodiment is configured such that the specimen position sensor includes an encoder wheel engageable with the plant specimen.

In a fifteenth embodiment, the apparatus of the twelfth embodiment is configured such that the specimen support includes a specimen support surface slidably engageable with the plant specimen and the apparatus further includes a drive member engageable with the plant specimen, the drive member slidingly moving the plant specimen along the specimen support surface.

In a sixteenth embodiment, the apparatus of the fifteenth embodiment is configured such that the drive member is a cylindrical roller engagable with the plant specimen.

In a seventeenth embodiment, the apparatus of the fifteenth embodiment is configured such that the drive member is positioned outside the sensing volume and the specimen support surface is configured to support the plant specimen as it travels from outside the sensing volume to inside the sensing volume and wherein the apparatus further includes at least one light seal engageable with the plant specimen where the plant specimen travels from outside to inside the sensing volume.

In an eighteenth embodiment, the apparatus of the fifteenth embodiment is configured such that movement of the plant specimen by the drive member defines a travel direction and the specimen support surface defines a linear groove extending in the travel direction and adapted to receive a rib of a leaf.

In a nineteenth embodiment, the apparatus of the fifteenth embodiment is configured such that the drive member is a cylindrical roller engageable with the plant specimen and the plant specimen is positionable between the drive member and specimen support surface, wherein movement of the plant specimen by the drive member defines a travel direction, and wherein the apparatus further includes a wedge-shaped engagement member positioned upstream of the drive member whereby the plant specimen is positioned between the engagement member and the specimen support surface and encounters the engagement member before the drive member when moving in the travel direction, the wedge-shaped member having a narrower end pointing way from the drive member whereby the engagement member is configured to unfurl the plant specimen as it moves in the travel direction.

In a twentieth embodiment, the apparatus of any one of embodiments 1 through 7 is configured such that the at least one light emitter includes a light enclosure assembly, the light enclosure assembly including a light source disposed within an enclosure wherein the enclosure defines an opening through which light from the light source is emittable from the light enclosure assembly and wherein the light enclosure assembly is positionable whereby the light emitted through the opening is incident upon the plant specimen and sensible by the image sensor.

In a twenty-first embodiment, the apparatus of the twentieth embodiment is configured such that the light enclosure assembly includes a diffuser positioned to diffuse light within the enclosure and an emitter lens positioned to gather diffuse light from within the enclosure and direct it outwardly from the enclosure through the opening.

In a twenty-second embodiment, the apparatus of the twenty-first embodiment is configured such that the light enclosure assembly further includes a reflector positioned to reflect direct light from the light source toward the diffuser and wherein the emitter lens is a cylindrical lens and the opening in the light enclosure assembly is an elongate slit having a length substantially greater than its width.

In a twenty-third embodiment, the apparatus of the twentieth embodiment is configured such that the light enclosure assembly wherein the light source is a halogen lamp and wherein interior surfaces of the enclosure subject to light from the halogen lamp are formed by a material including polytetrafluoroethylene.

In a twenty-fourth embodiment, the apparatus of the fifteenth embodiment is configured such that the at least one light emitter includes a light enclosure assembly, the light enclosure assembly including a light source disposed within an enclosure wherein the enclosure defines an opening through which light from the light source is emittable from the light enclosure assembly and wherein the light enclosure assembly is positionable whereby the light emitted through the opening is incident upon the plant specimen and sensible by the image sensor; wherein the light source is a halogen lamp and wherein interior surfaces of the enclosure subject to light from the halogen lamp are formed by a material including polytetrafluoroethylene; and wherein a panel of material including polytetrafluoroethylene forms a portion of the enclosure, the panel defining one of the interior surfaces of the enclosure on a first side of the panel and forming the specimen support surface on the opposite side of the panel.

In a twenty-fifth embodiment, the apparatus of the twenty-fourth embodiment is configured such that movement of the plant specimen by the drive member defines a travel direction and the opening in the light enclosure assembly is an elongate slit having a length substantially greater than its width, the length of the slit extending in a direction perpendicular to the travel direction and wherein the panel defines a linear groove extending in the travel direction and adapted to receive a rib of a leaf in the specimen support surface.

In a twenty-sixth embodiment, the apparatus of the twenty-fifth embodiment is configured such that the light enclosure assembly includes a polytetrafluoroethylene surface within the light enclosure assembly positional to reflect light from the halogen lamp towards the slit and wherein the light enclosure assembly defines an exterior surface and at least a portion of the exterior surface is formed by a metal material.

In a twenty-seventh embodiment, the apparatus of any one of embodiments 1 through 7 is configured such that the light emitted from the at least one light emitter and incident on the plant specimen that is sensed by image sensor defines an optical path from the light emitter to the image sensor, wherein the apparatus includes a plurality of optical components interacting with the light defining the optical path and wherein the at least one light emitter and the image sensor each define one of the plurality of optical components and wherein the apparatus further includes a lens assembly disposed in the optical path the lens assembly including a lens holder defining a passageway through which the optical path extends and having a lens disposed therein; and an adjustment member coupled with the lens and having a user-interface accessible by a user disposed on an exterior surface of the housing, the adjustment member configured to move the lens within the passageway based upon user input received by the user-interface.

In a twenty-eight embodiment, the apparatus of the twenty-seventh embodiment further includes a diffraction grating disposed in the optical path between the plant specimen and the image sensor.

In a twenty-ninth embodiment, the apparatus of any one of embodiments 1 through 7 is configured such that the at least one light emitter includes a plurality of LEDs and wherein the apparatus is configured to acquire images of the plant specimen under a plurality of different lighting conditions with the image sensor, including hyperspectral images and images wherein the light incident on the plant specimen is within a predefined wavelength band, the plurality of LEDs being selectively actuated to generate a plurality of different predefined wavelength bands whereby images can be acquired at each of the plurality of different predefined wavelength bands.

In a thirtieth embodiment, the apparatus of the twenty-ninth embodiment further includes an LED switching circuit having a plurality of parallel branches, each branch including an NPN transistor and controlling a portion of the plurality of LEDs wherein each portion of the plurality of LEDs controlled by a separate branch defines a predefined wavelength band.

In a thirty-first embodiment, the apparatus of the thirtieth embodiment is configured such that one of the branches controls LEDs emitting infrared light.

In a thirty-second embodiment, the apparatus of the thirtieth embodiment is configured such that the plurality of LEDs include blue LEDs emitting light with a wavelength within the range of 350 to 480 nm and wherein the blue LEDs are illuminated with a halogen light source for hyperspectral imaging of the plant specimen and the blue LEDs are the sole source of incident light for acquiring a fluorescent image of the plant specimen at a predefined wavelength band.

In a thirty-third embodiment, the apparatus of the thirty-second embodiment is configured such that the plurality of LEDs include non-blue LEDs generating light outside the range of 350 to 480 nm and the non-blue LEDs are used to acquire fluorescent images of the plant specimen at at least one predefined wavelength band outside the range of 350 to 480 nm.

In a thirty-fourth embodiment, the apparatus of any one of embodiments 1 through 7 is configured such that the light emitted from the at least one light emitter and incident on the plant specimen that is sensed by image sensor defines an optical path from the light emitter to the image sensor, wherein the apparatus includes a plurality of optical components interacting with the light defining the optical path and wherein the at least one light emitter and the image sensor each define one of the plurality of optical components and wherein the at least one light emitter includes a plurality of LEDs and the apparatus further includes an LED support member, the LED support member being disposed between the plant specimen and the image sensor and having a central opening through which the optical path extends, the plurality of LEDs being disposed on the LED support member and circumferentially distributed about the central opening.

In a thirty-fifth embodiment, the apparatus of any of embodiments 1 through 7 further includes a wireless communications transceiver coupled with the processor and wherein the processor is configured to obtain locational data through the transceiver and append acquired images with identifying information, the identifying information including locational data.

In a thirty-sixth embodiment, the apparatus of the thirty-fifth embodiment is configured such that the processor is configured to wirelessly communicate the acquired images and identifying information to an external device.

A thirty-seventh embodiment takes the form of a method of using the apparatus of the thirteenth embodiment wherein the method includes communicating the positional information about each region of interest on the plant specimen for each acquired image to processor and associating the positional information with the relevant image, and utilizing the positional information about each image when analyzing the acquired images to assess the health of the plant specimen.

In a thirty-eight embodiment, the method of the thirty-seventh embodiment is performed such that the step of analyzing the acquired images to assess the health of the plant specimen includes distinguishing between nitrogen hunger and potash deficiency of corn plant specimens.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 18 is a cut-away perspective view of a second embodiment.

FIG. 19 is a partial schematic view of an assembly for moving a plant specimen relative to the optical path of the assembly.

FIG. 22 is a schematic side view of the assembly of FIG. 19 in an open position.

FIG. 23 is a schematic side view of the assembly of FIG. 19 in a closed position.

Figure 1:
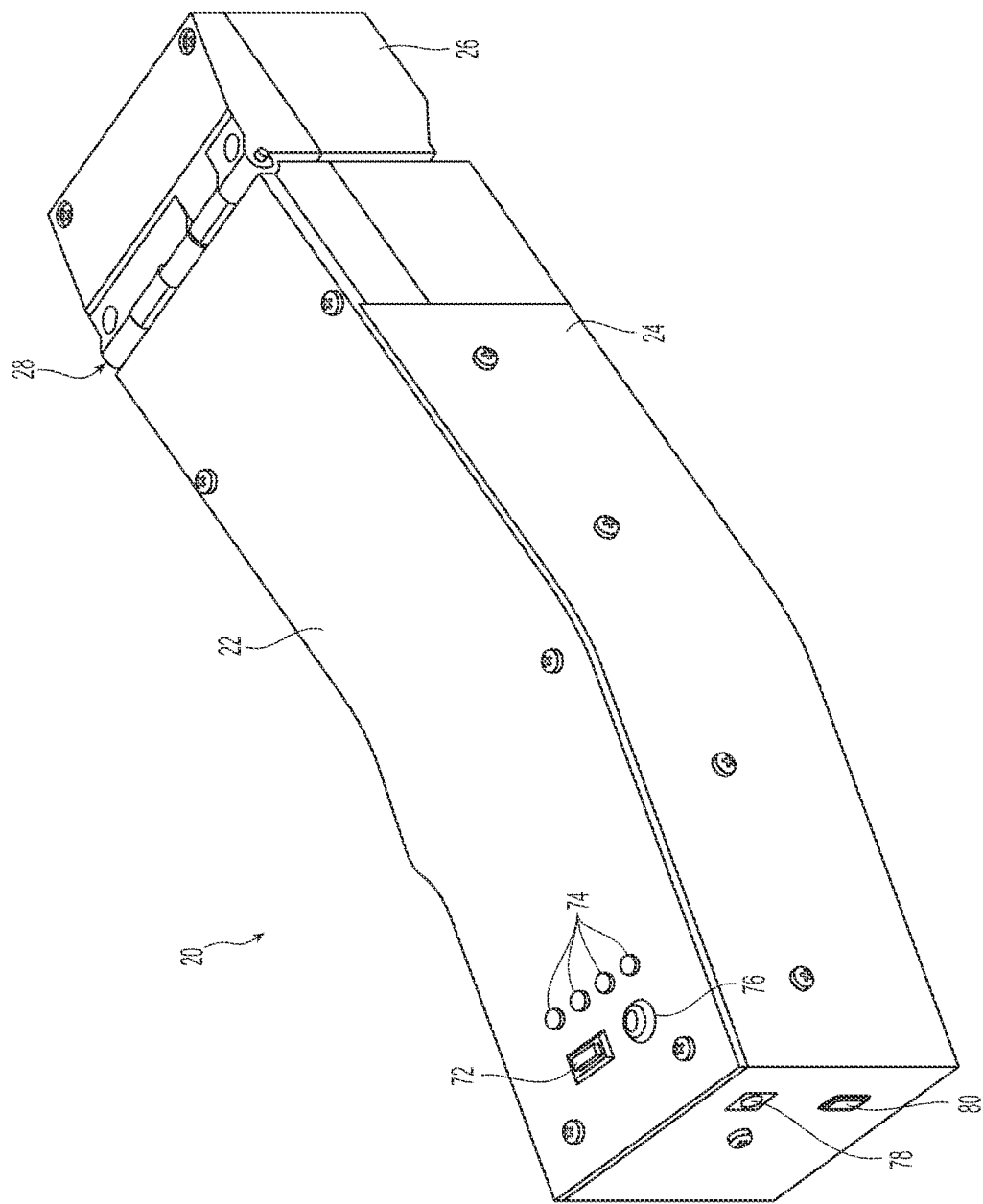
FIG. 1 is a perspective view of a first embodiment of a portable system.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

A portable apparatus 20 for analyzing plant specimens is shown in FIGS. 1-4. Apparatus 20 is a portable device and is sized to allow it be easily carried between locations by an individual person so that it may be employed at the location where the plant specimen being analyzed has been grown. Apparatus 20 includes a housing assembly 22 with a main body 24 and a pivotal section 26. Pivotal section 26 is secured to main body 24 with hinge assembly 28 that allows section 26 to pivot relative to main body 24.

Housing assembly 22 defines an interior sensing volume 30 when in a closed configuration (FIG. 1). Pivotal section 26 is pivotally moveable between an open position (see dashed lines in FIG. 4) and a closed position (FIG. 1). By moving pivotal section 26 to its open position, a user can access sensing volume 30 and position a plant specimen for analysis as further discussed below. Moving pivotal section 26 to its closed position secures the plant specimen and places housing assembly 22 in its closed configuration. In its closed configuration, housing assembly 20 controls the entry of ambient light into sensing volume 30. In the illustrated embodiment, housing assembly 22 prevents the entry of ambient light into sensing volume 30 when in the closed configuration. By preventing all, or substantially all, entry of ambient light into sensing volume 30, the light used to capture images of the plant specimen will be only that generated by apparatus 20 and can, thereby, be more precisely controlled.

Apparatus 20 includes a plurality of light sources or light emitters which are supported either directly or indirectly by housing assembly 22. These light emitters are positioned to emit light into sensing volume 30 when housing assembly 22 is in its closed configuration to thereby provide for the capture of one or more images of the plant specimen as further discussed below.

A specimen support 32 is coupled with the housing and positions a plant specimen 34 so that images of plant specimen 34 can be captured with apparatus 20. In the embodiment of FIGS. 1-4, specimen support 32 is defined by engagement between pivotal section 26 and main body 24 of housing assembly 22. More particularly, flexible, resilient seals 36 encircle the openings to sensing volume 30 on both pivotal section 26 and main body 24. Seals 36 may be formed out of a closed cell foam or other suitable material. Plant specimen 34 is positioned to extend across the openings defined by seals 36 with pivotal section 26 in an open position. Plant specimen 24 is then gripped between the two seals 36 when pivotal section 26 is closed to thereby hold the specimen in place so that light emitted from one of the light emitters that is incident upon the specimen can be captured by the image sensor.

An image sensor 38 is used to capture images of plant specimen and may take the form of a CMOS (complementary metal-oxide semiconductor), CCD (charge coupled device), or other suitable sensor. In the embodiment of FIGS. 1-4, image sensor 38 is a CMOS sensor which is part of a digital camera assembly 40 which also includes a lens 42.

Apparatus 20 is configured to acquire images with image sensor 38 under a plurality of different lighting conditions. For example, apparatus 20 can be used to capture a hyperspectral reflectance image, a hyperspectral transmittance image and fluorescent images of a region of interest on the plant specimen in a single imaging sequence. Plant specimen 34 can then be repositioned and a series of images can be captured at a different region of interest on the specimen.

Figure 2:
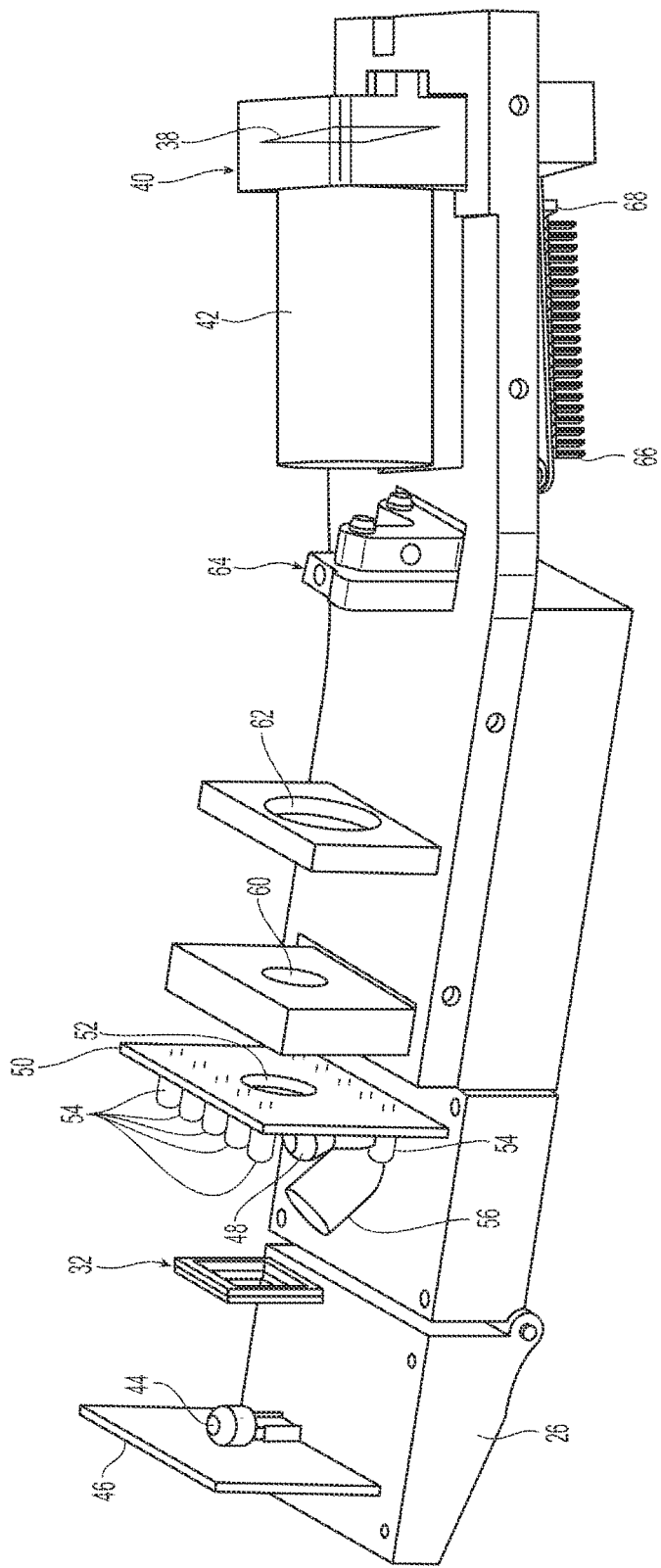
FIG. 2 is a partial perspective view of the first embodiment.
Figure 3:
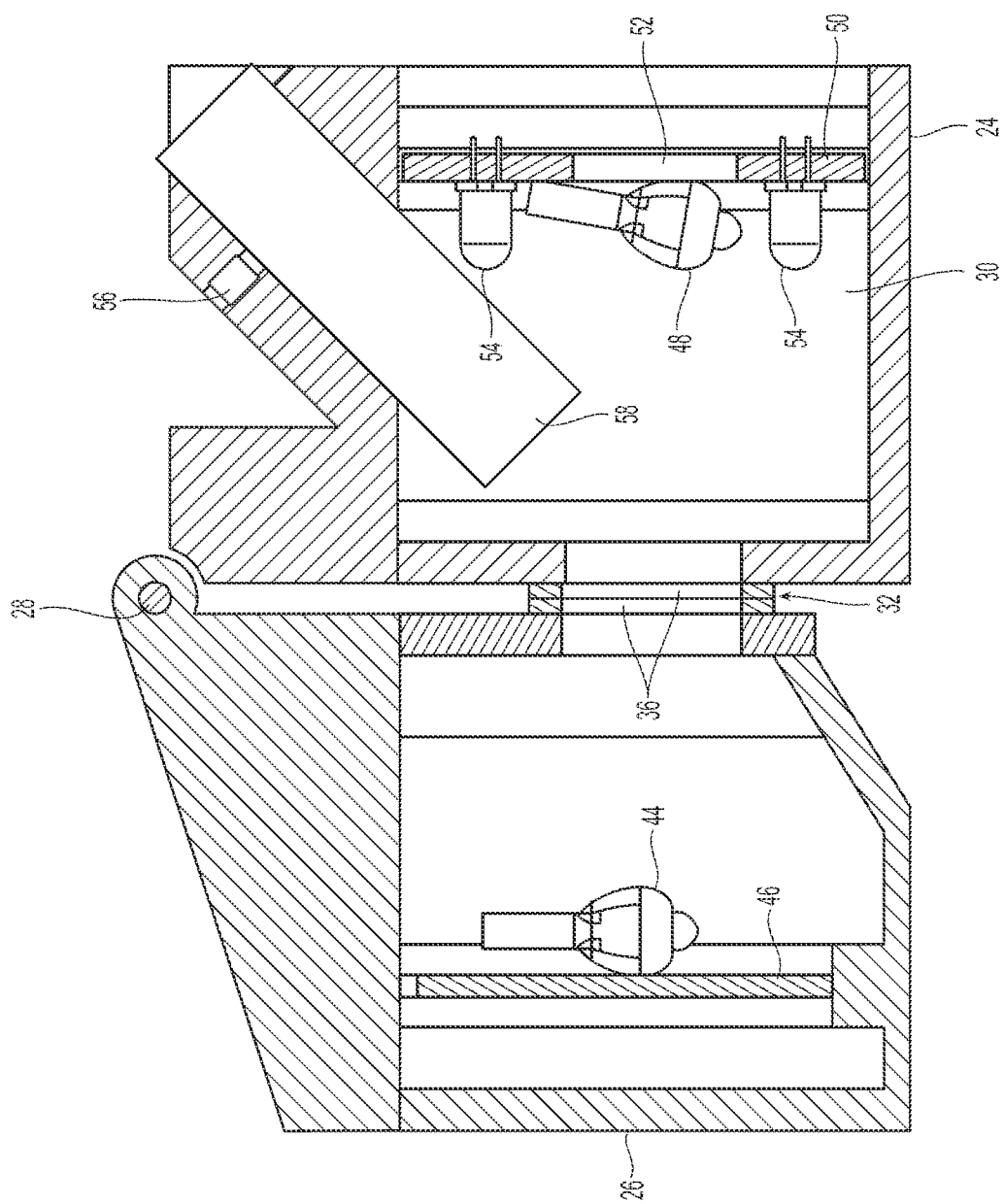
FIG. 3 is a cross sectional view of a portion of the first embodiment.
Figure 4:
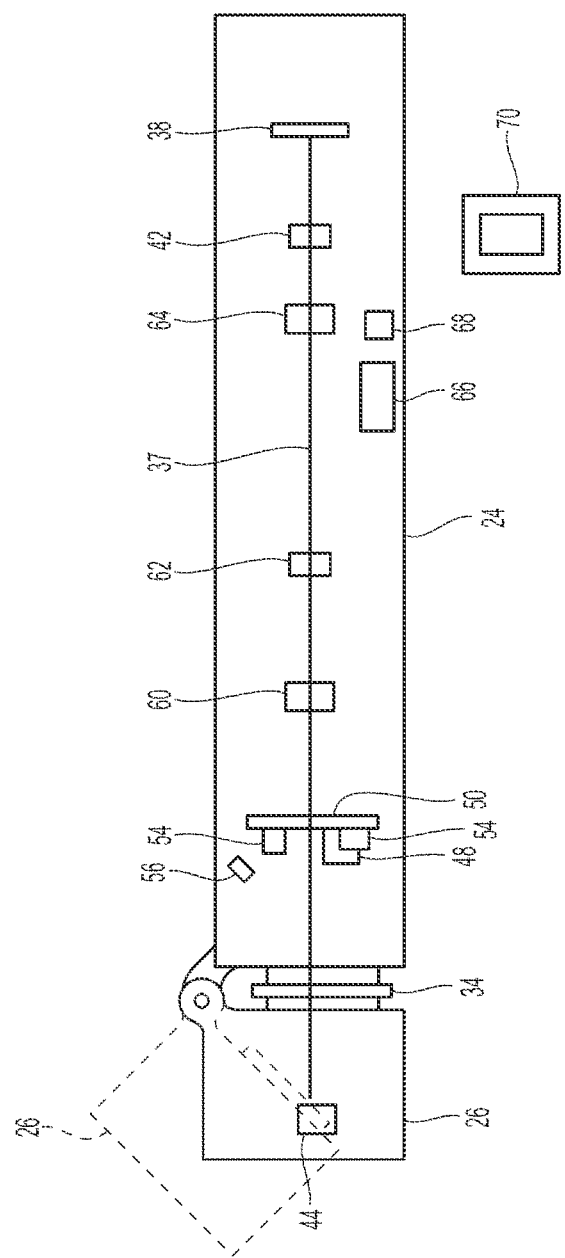
FIG. 4 is a schematic view of the first embodiment.

Apparatus 20 includes several different light sources to provide the different lighting conditions used to capture the images. As best seen in FIGS. 2 and 3, apparatus 20 includes a first halogen light source in the form of a halogen lamp 44 mounted on a light board 46 disposed in pivotal section 26 of housing 22. A second halogen lamp 48 is mounted on board 50. Board 50 has a central opening 52 through which plant specimen 34 is viewable by image sensor 38. A plurality of LEDs (light emitting diodes) 54 are mounted on board 50 which thereby acts as an LED support member. LED support member/board 50 is positioned between specimen support 32 (which holds plant specimen 34) and the image sensor 38. LEDs 54 are circumferentially distributed about central opening 52. Apparatus 20 also includes a laser light source 56 which projects light from opening 58 onto the plant specimen.

Halogen lamps 44, 48, LEDs 54 and laser light source 56 all act as light emitters which can be selectively actuated to generate light that is incident on plant specimen 34 and subsequently sensed by image sensor 38. When actuated, the emitted light defines an optical path 37 from the light emitter to the image sensor 38. Other optical components may also interact with the light along the optical path. In apparatus 20, these additional optical components include a slit 60, lens 62, diffraction grating 64 and lens 42.

When housing assembly 22 is in the closed configuration for capturing images, specimen support 32 is positioned between image sensor 38 and first halogen light source 44 whereby actuation of light emitter 44 allows image sensor 38 to capture a hyperspectral transmittance image from light emitted by source 44 and transmitted through plant specimen 34.

Second halogen light source 48, laser light source 56 and the array of LEDs 54 are all positioned between specimen support 32 and image sensor 38 to thereby allow image sensor 38 to capture light from these sources which has been reflected by plant specimen 34.

For example, image sensor 38 can capture a hyperspectral reflectance image generated by light emitted from halogen light source 48. LED lights may be activated together with halogen light source 48 when acquiring a hyperspectral reflectance image.

In the illustrated apparatus 20, halogen light sources 44, 48 are tungsten halogen light sources which provide a low cost light emitter. One drawback to tungsten halogen light sources, however, is that they are weak in lower wavelengths in the blue and purple range. Apparatus 20 includes LEDs 54 which emit light in the blue range and which may have a wavelength between 430 to 505 nm. Advantageously, the blue LEDs used with apparatus 20 emit light having a wavelength between 430 and 480 nm. By activating the blue LEDs emitting light within a range from 430 to 480 nm together with a tungsten halogen light source, a smooth and uniform lighting can be provided over a wide spectrum to provide high quality hyperspectral imaging.

The array of LEDs 54 in apparatus 20 includes not only blue LEDs but also LEDs which emit light at other wavelengths within the range of 350 nm to 480 nm. Distinct sets of LEDs emitting light within a limited wavelength band are selectively activated to obtain multispectral images. In other words, the blue LEDs may be activated to obtain a first image, LEDs emitting light in the red wavelength range may then be activated to obtain a second image, LEDs emitting light in the yellow wavelength range may be activated to obtain a third image and LEDs emitting light in the green wavelength range may be activated to obtain a fourth image. Depending upon the type of plant and analysis being performed activation of these individual, distinct wavelength bands may reveal useful information. For example, different proteins of interest may be fluoresced by light emitted in the red, yellow and green wavelength bands. LEDs emitting light in the infrared band may also be included in the array of LEDs mounted on board 50.

The various of light emitters in apparatus 20 may be used as an excitation light source for acquiring more than one type of image thereby providing a cost-effective assembly. For example, the blue LEDs may be used together with a halogen light for a hyperspectral image and may be the sole light sources activated for fluorescent imaging at blue wavelengths.

Laser light source 56 can also be activated to acquire a fluorescent image. Advantageously, laser light source 56 can be used to emit light having a wavelength in the range of 400 to 410 nm. Light within this wavelength range, and most particularly at a wavelength of 405 nm, functions as an excitation light for chlorophyll in plant specimens and is, therefore, useful in assessing the chlorophyll content of the plant specimen.

Image sensor 38 is advantageously a hyperspectral sensor instead of a RGB (red, green, blue) or grey scale sensor. This allows observation of the spectral response of fluorescence for each of the plant fluorescent responses at differing wavelengths. This combination of "multiple excitation bands" plus "hyperspectral fluorescent response" provides a unique imaging apparatus that can provide a wide range of plant health information.

Apparatus 20 also includes a processor 66 which is operably coupled with the light emitters 44, 48, 54, 56 and image sensor 38 to control operation of apparatus 20 whereby image data captured by image sensor 38 is thereby obtained to assess one or more properties of the plant specimen 34. In the illustrated embodiment, processor 66 is a Raspberry Pi which is commercially available from the Raspberry Pi Foundation in the United Kingdom and is a single board computer that includes a transceiver 68 for wireless communication. ODROID by Hardkernel Co., Ltd. of South Korea, and other processing units, may alternatively be used.

In the illustrated embodiment, embedded processor 66 can be connected through transceiver 68 with a smartphone 70 wirelessly through Bluetooth or other wireless communication protocol. This arrangement allows the user to operate apparatus 20 by using an application on smartphone 70. In this regard, it is noted that apparatus 20 could rely on an external device, such as smartphone 70, to provide the processor necessary to provide all of the control functions necessary for the operation of apparatus 20, or, a smartphone, or similar communication device, could be an embedded part of apparatus 20.

Embedded processor 66, an application on smartphone 70, or a remote external server in communication with smartphone 70 may be used to analyze and process the image data acquired by apparatus 20 to assess various properties of the plant specimen such as chlorophyll content and other health parameters. For example, processor 66 may be configured to wirelessly communicate the acquired images and identifying information to an external device such as smartphone 70.

Advantageously, each of the acquired images are associated with identifying information about the image and plant specimen. For example, labels or similar data packages may be associated with each image that identifies the light emitters used when acquiring the image, the type of plant being examined, the location of the region of interest on the plant specimen captured in the image, a time stamp indicating when the image was acquired and the geographical location where the plant was grown and/or the image acquired. Further information deemed useful could also be associated with the plant specimen. The time stamp and geographical information can be easily generated by processor 66. For example, most processors include the ability to generate time stamps and most telecommunication devices, such as smartphone 70, can identify the geographical location of the smartphone. It is also possible for the user to input data for association with the images. For example, an application on smartphone 70 could be used for such input. Alternatively, apparatus 20 could include a dedicated user input device.

By providing apparatus 20 with a wireless communications transceiver 68 coupled with processor 66, processor 66 can be readily configured to obtain locational data through transceiver 68, e.g., from smartphone 70, and append acquired images with identifying information that includes the locational data.

The GPS (global positioning system) precision of a typical smartphone is about 3-6 meters in North America. Some plant breeding experiments have plot sizes smaller than 3 meters. In such circumstances where greater geographic precision is necessary to identify the specific plot of a plant specimen, processor 66 may be configured to allow the user to append additional identifying information to the images and thereby identify the specific experimental plot from which the specimen was obtained. The identifying information will be part of the feature data of each image or individual data package uploaded to the server, so the plant specimen data can be easily linked to specific plot locations.

The ability to append such geographic information to the data provides several benefits. For example, GIS (geographic information system) mapping data services can be provided with the geo-referenced plant health data collected from many different locations over a geographic region by one or more users employing one or more apparatus 20 which has been uploaded to a cloud storage facility or other similar arrangement. The service may include real time data on regional plant growth stage, plant stresses (drought, nutrition, heat, insects, disease, etc.), regional crop yield predictions, climate impacts. If a representative sample of a region's agricultural producers can be included in the data, such data can be used to issue warnings to farmers who may thereby take steps to mitigate or reduce threats to the crop and/or to policy makers who may be thereby warn the general public and take steps to mitigate or reduce threats related to diminished food production for the region.

Current remote sensing technologies for precision agriculture provide a top view of the plant canopy at a relatively low resolution. Apparatus 20 can provide detailed information on the lower leaves which are normally more stressed. Apparatus 20 also has the potential to be implemented in a fashion that allows apparatus to be moved between crop rows to gather such additional information and provide phenotyping for the lower leaves.

In the illustrated embodiment of FIGS. 1-4 and as can be seen in FIG. 1, apparatus 20 includes a power switch 72 for activating and deactivating apparatus 20. Indicator lights 74 are used to communicate information to the user. Depressing button 76 initiates a communication pairing process that connects processor 66 with an external device such as a smartphone, for example, by using a Bluetooth pair process. A charge port 78 is used to connect apparatus with an electrical power source for charging one or more rechargeable batteries employed by apparatus 20. A data port 80 allows data to be transmitted between processor 66 and an external device. In some embodiments, apparatus 20 may not include wireless communication capabilities and data port 80 could be used to export data from apparatus 20. Port 80 may also be used to update the operating software of apparatus 20 or to debug the apparatus.

Figure 5:
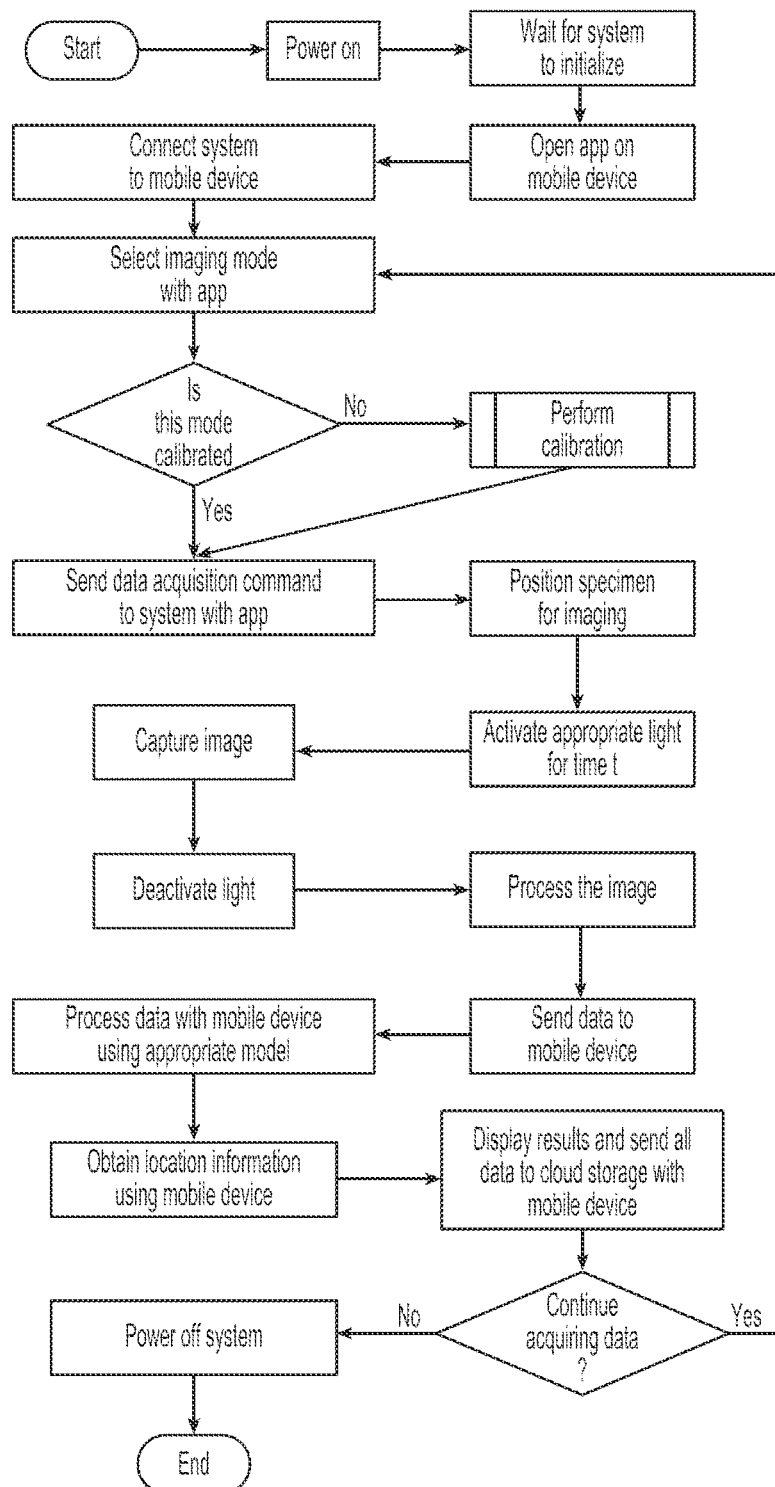
FIG. 5 is a flow chart of the operation of the first embodiment.
Figure 6:
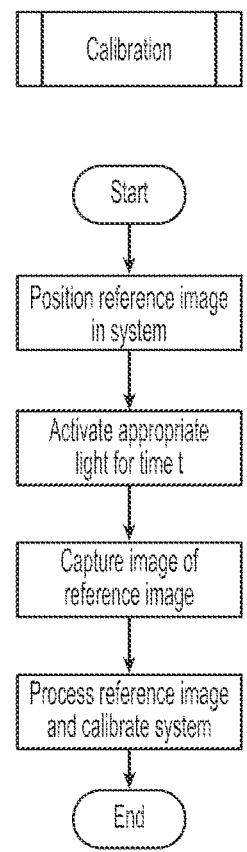
FIG. 6 is a flow chart of the calibration process.

FIGS. 5 and 6 are flowcharts representing the operation of apparatus 20. FIG. 5 presents a flowchart for acquiring an image using apparatus 20 while FIG. 6 represents a calibration process. With regard to the calibration process, it is noted that the reference image referred to in the flowchart is a planar member with a surface having a known and predefined color. For example, the reference image may be a white surface which allows the system to be calibrated to the known properties of this surface. It might alternatively be a grey surface or other colored surface having known properties. Or, multiple reference images having different properties might be used in the calibration process.

Figure 7:
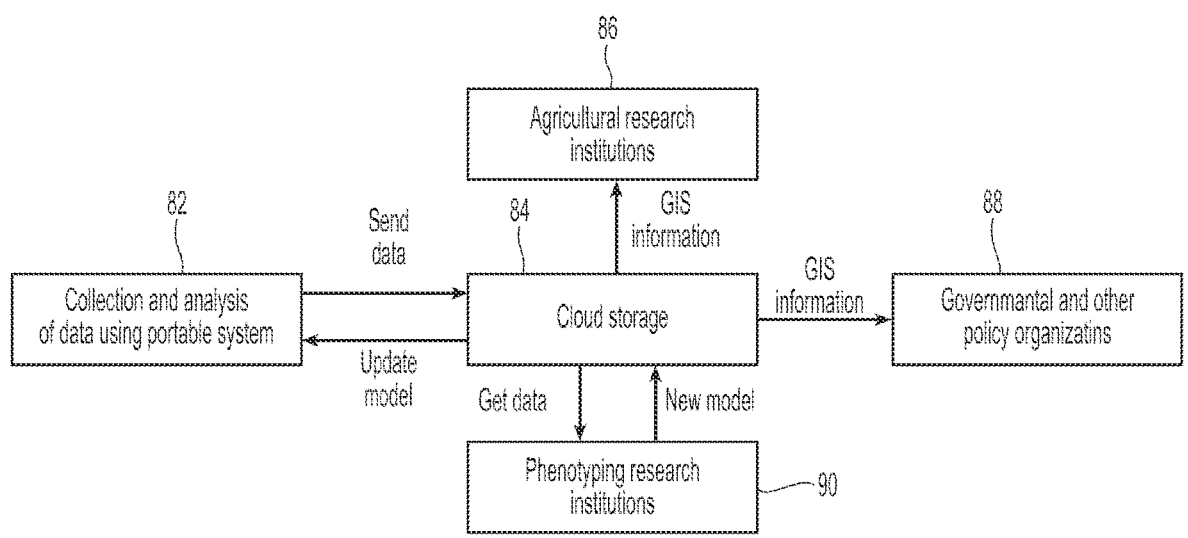
FIG. 7 is a diagram showing interactions between users of the system.

FIG. 7 is a diagram showing interactions between users of the system. In FIG. 7, block 82 represents the users in the field employing apparatus 20 to acquire data. Apparatus 20 communicates with a central computer network having cloud storage as represented by block 84. Apparatus 20 uploads the acquired data and may also download updates to the software employed by apparatus 20. For example, the models used to analyze the acquired data might be improved and updated and such improved models could be downloaded by apparatus 20. Block 86 represents agricultural research institutions such as educational institutions and agricultural industry participants, e.g., seed companies, having their own research facilities. Such institutions would find the data acquired by apparatus 20 to be quite useful, for example, in the development of new plant varieties, and particularly when it is paired with geographical information and/or specific experimental plot identification information. Block 88 represents governmental and other policy organizations. Such organizations may analyze regional information for guidance when setting agricultural policies or issuing warning or alerts to the agricultural producers or general public. Block 90 represents phenotyping research institutions which are involved in developing methods to assess plant health based on the acquired images. Such institutions may develop improved models for processing the image data acquired by apparatus 20. It is also noted that there may, and likely would be, overlap between the institutions identified by blocks 86, 88 and 90. For example, it may be many of the same institutions who are involved in both the agricultural research of block 86 and the phenotyping research of block 90. Such institutions may also play a role in developing policies for implementation by governmental bodies (block 88) and such governmental bodies may also be involved in research represented by blocks 86, 90.

When acquiring an image of a plant specimen, the mid-rib on the leaves, e.g., corn leaves, and veins on the leaf will typically impact the imaging result. Previous hand-held plant sensors are known to combine all the image data it collects to provide an average or other value based upon all of the gathered data. The embodiments described herein employ an image processing module to analyze the variance among the pixels and automatically remove outlier pixels which may be due to dust, spraying pollution, mid-rib, veins, etc., before calculating a value based on the image. This provides a higher signal over noise ratio.

Figure 9:
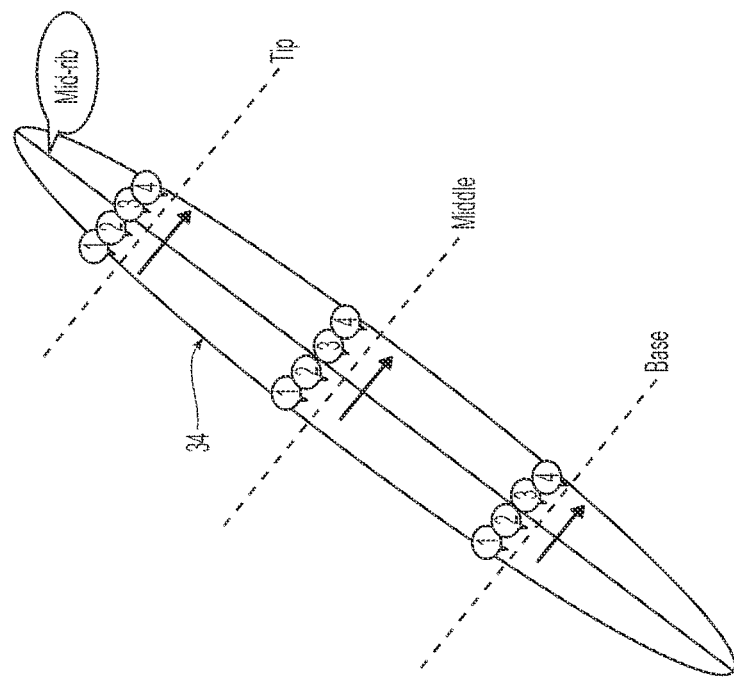
FIG. 9 is another view of a plant specimen showing separate regions of interest for capturing images.
Figure 8:
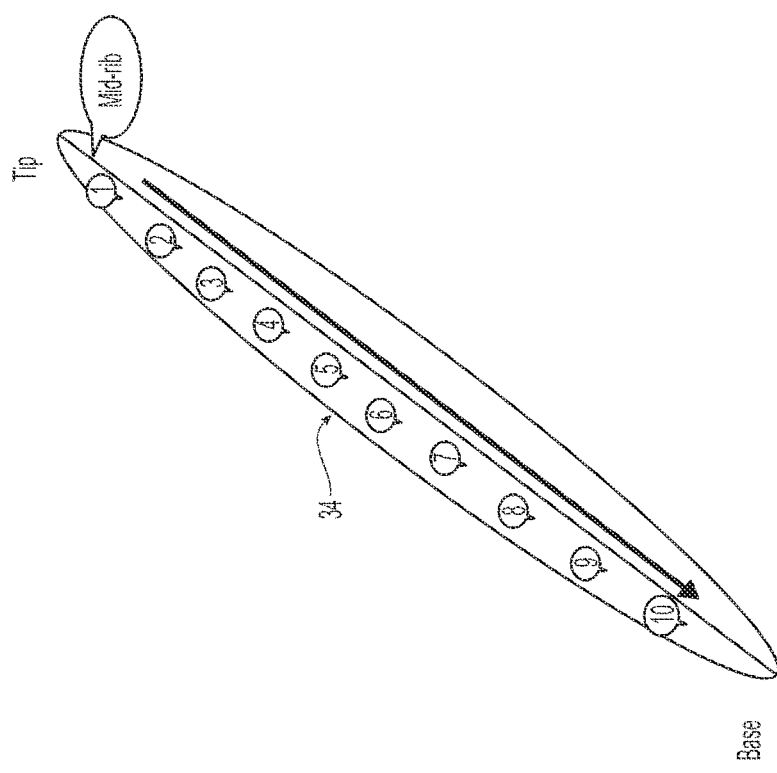
FIG. 8 is a view of a plant specimen showing separate regions of interest for capturing images.

As used herein, a region of interest refers to an area on a plant specimen for which an image is captured for subsequent analysis. While a region of interest may encompass an entire leaf, it will more typically encompass a smaller area at a particular location on a leaf. The properties of the leaf may vary for different regions of interest on the leaf depending upon the location of the region of interest. Such regions of interest ("ROIs") can be understood with reference to FIGS. 8 and 9. FIG. 8 illustrates ten separate ROIs (numbered 1-10 in FIG. 8) which extend along a line parallel to the mid-rib of the leaf from the tip of the leaf toward the base of the leaf. FIG. 9 illustrates three sets of four ROIs which extend along lines perpendicular to the mid-rib of the leaf. A first set of the ROIs is located near the tip of the leaf, a second set is located near the middle of the leaf, and the third set is located near the base of the leaf. Each of these three sets has four ROIs numbered 1-4 in FIG. 9. As further discussed below, acquiring images at a plurality of different ROIs at different locations on the plant specimen can provide for the acquisition of much more useful and informative data.

Apparatus 20 shown in FIGS. 1-4 is configured such that specimen support 32, light emitters 44, 48, 54, 56 and image sensor 38 are all fixed relative to housing assembly 22 when housing assembly 22 is in the closed configuration. To acquire images at multiple ROIs on a single specimen 34 using apparatus 20, the specimen must be manually repositioned. To facilitate this, a separate case or cartridge for holding the plant specimen could be employed and the case or cartridge could then be repositioned.

An alternative apparatus 100 is shown in FIGS. 18-23 and provides a portable apparatus having the same imaging capabilities as apparatus 20 and further includes a mechanism for relative movement between plant specimen 34 and the optical path defined by the apparatus whereby images can be acquired at multiple ROIs on the plant specimen without having to manually reposition the plant specimen. In other words, apparatus 100 is configured such that the light emitted from a light emitter and incident on plant specimen 34 that is sensed by image sensor 38 defines an optical path from the light emitter to the image sensor. Apparatus 100 includes a plurality of optical components interacting with the light defining the optical path with the light emitter and image sensor each being one of the plurality of optical components. The plant specimen engaged by the specimen support is movable relative to at least one of the plurality of optical components in the optical path.

In the illustrated embodiment 100, it is plant specimen 34 which is moved relative to the optical path. However, in alternative embodiments, one or more of the optical components could be moved relative to the rest of the apparatus to thereby acquire images at different ROIs on the plant specimen. For example, apparatus 100 could employ a series of mirrors with one or more of the mirrors being moveable to obtain such a result.

Apparatus 100 is shown in FIG. 18 and includes a digital camera assembly 102 having an image sensor 104 in the form of a CMOS sensor and lens 106. Optical components disposed within sensing volume 136 of housing assembly 124 and positioned forward of lens 106 include a diffraction grating 108, a lens 109, a slit 110, and a lens 112. It is noted that by using a wide angle lens 112 the distance between the lens and the specimen can be reduced and thereby provide for a more compact and lightweight apparatus. A transmittance light enclosure assembly 116 acts as a light emitter for light that is transmitted through the plant specimen and is further described below. A reflectance light enclosure assembly 118 acts as a light emitter for light that is reflected by the plant specimen.

Apparatus 100 includes a controller assembly 120 which includes a processor and wireless communications capabilities and functions similar to processor 66 and transceiver 68. A rechargeable battery pack 122 provides electrical power to the various elements of apparatus 100. It is noted that internal wiring for control signals and electrical power are not illustrated in the figures for either apparatus 20 or apparatus 100 for purposes of graphical clarity.

Apparatus 100 is configured such that the image sensor 104 acquires images under a plurality of different lighting conditions and plant specimen 34 is moved relative to at least one of the plurality of optical components in the optical path to thereby define a plurality of different regions of interest viewable by the image sensor 104 on plant specimen 34. Similar to apparatus 20, apparatus 100 includes halogen lamps, an array of LEDs and a laser light source to generate the lighting conditions necessary for hyperspectral and multispectral images. At each region of interest, a plurality of images subject to different lighting conditions are acquired.

In the illustrated embodiment, relative movement between the plant specimen and one or more components of the optical path to provide a view of a different region of interest on the plant specimen is obtained by moving the plant specimen relative to housing assembly 124 and maintaining the optical path components in a fixed position relative to housing assembly 124. In other words, the plant specimen is moved relative to apparatus 100 to obtain images of different regions of interest on the plant specimen.

Movement of the plant specimen can be understood with reference to FIGS. 19-23 which illustrate specimen support assembly 126. Specimen support 126 includes a specimen support surface 128 on which plant specimen 34 slides to reposition the plant specimen. A drive member 130 engages the plant specimen and selectively causes plant specimen 34 to slide along surface 128. In the illustrated embodiment, drive member 130 is a cylindrical roller engageable with plant specimen 34. A spring 132 biases the support surface 128 toward drive member 130 to thereby ensure engagement of the plant specimen 34 with drive member 130. Stop posts 132 limit the travel of support surface 128 in the direction toward engagement member 130.

Similar to apparatus 20, housing assembly 124 of apparatus 100 encloses a sensing volume 136 and controls the entry of ambient light into sensing volume 136 to provide high quality imaging of the plant specimen which takes place within sensing volume 136. In the illustrated embodiment, housing assembly 124 limits, and substantially prevents, entry of ambient light into sensing volume 136 when acquiring images of the plant specimen.

Drive member 130 is positioned outside sensing volume 136 and specimen support surface 128 is configured to support the plant specimen as it travels from outside sensing volume 136 to inside sensing volume 136. One or more flexible light seals 138 are provided and lightly engage the plant specimen at the location where the plant specimen travels from outside to inside the sensing volume 136.

A specimen position sensor 140 is used to obtain positional information on the plant specimen for each of the plurality of regions of interest at which images are acquired and this information is communicated to controller/processor 120. In the illustrated embodiment, specimen position sensor 140 takes the form of an encoder wheel that is engaged with the plant specimen and which is positioned opposite drive cylinder 130. As the plant specimen is slid along surface 128 it engages encoder wheel 140 and causes it to rotate an amount that corresponds to the linear sliding travel distance of the plant specimen. This allows the relative positions of the regions of interest on the plant specimen to be determined. The use of encoder wheels is well known to those having ordinary skill in the art.

Alternative arrangements may also be employed to provide a specimen position sensor for apparatus 100. For example, the controls operating a servo motor driving cylindrical roller 130 could be used to calculate the linear sliding distance of the plant specimen. Alternatively, images of the entire or large portion of the plant specimen could be acquired and image processing techniques used to determine relative positions of the regions of interest on the plant specimen. Image mosaicing technologies, wherein multiple image strips or lines will be matched with adjacent images and then combined to form a larger image, may also be used to assess the movement distance between neighboring images. Another alternative would be to shine patterned light onto the leaf surface and track the reflectance change to measure the movement distance in a manner similar to how an optical computer mouse functions.

When apparatus 100 records images of plant specimen 34 it acquires images of a limited area of the specimen that correspond to the regions of interest depicted in FIGS. 8 and 9. The use of a position sensor allows controller assembly 120 to determine the position of each region of interest relative to the tip and base of the leaf. FIG. 9 illustrates three separate locations, i.e, near the tip, near the middle and near the base, on the leaf where a set of four regions of interest can be acquired. In the illustrated embodiment slots 154, 168 control the emitted light and cause it to illuminate a small portion of the specimen sample that would encompass the four regions of interest across the width of the plant specimen as depicted in FIG. 9 but not the entire length of the plant specimen. Thus, images at the four regions of interest near the tip can be acquired without moving the leaf. The leaf can then be moved to allow images to be acquired at the four regions of interest in the middle of the leaf and then near the base. Individual regions of interest extending along the lull length of the leaf (as depicted in FIG. 8) may also be acquired as the leaf is moved between the positions indicated in FIG. 9.

When acquiring images of the individual regions of interest on the plant specimen, an image of a larger area may be acquired, e.g., encompassing four regions of interest distributed across the width of the specimen, with the images then being cropped to limit the area encompassed by the image to the selected region of interest or by simply limiting the analysis to the particular regions of interest. An image of the entire leaf can be obtained by combining together the individual images of the leaf.

When acquiring such images it is desirable to communicate the positional information about each region of interest on the plant specimen to controller/processor 120 so that it can be associated with the relevant image. This positional information may originate with the position sensor 140 and/or with an image processing software module used to crop the images to define a particular region of interest. As discussed below, this positional information can be very helpful when it is utilized in the analysis of the images to assess the health of the plant specimen.

Figure 10:
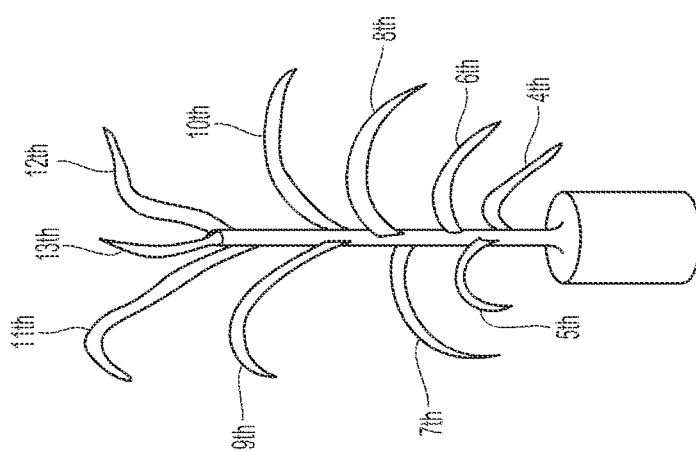
FIG. 10 is a view of a corn plant having a plurality of leaves.

FIG. 10 is a representation of a corn plant with the leaves labelled 4th through 13th. The 4th leaf is the lowest and oldest of the leaves and the 13th leaf is the uppermost and youngest leaf. FIGS. 11-17 are charts and diagrams displaying data obtained by taking images of corn leaves similar to those depicted in FIG. 10 by fluorescing the leaves with light having a wavelength of approximately 405 nm to assess the chlorophyll content of the specimen at the region of interest that has been fluoresced. By measuring the response of a region of interest in a captured image to the fluorescing light, a relative measure of chlorophyll content can be obtained. Such relative measures may also be calibrated to quantitative chlorophyll content measurements.

As is evident from the data presented in FIGS. 11-17, the chlorophyll content not only varies depending upon what leaf of the plant is selected but also varies between different locations on the same leaf. Taking only a single spot measurement will not provide the same information that can be obtained with imaging data that is supplemented with information regarding the location where, on the plant and/or individual leaf, the region of interest that is the subject of the image is located.

Figure 11:
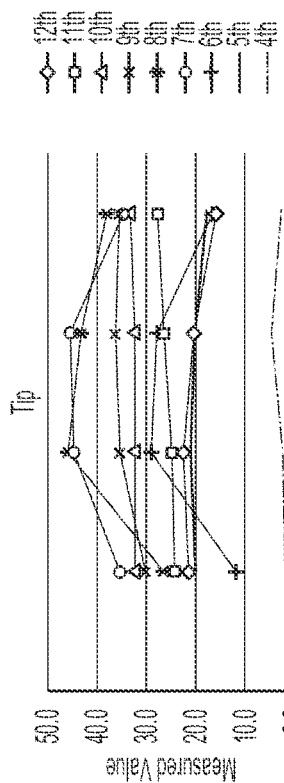
FIG. 11 is a chart showing imaging results obtained from the corn plant of FIG. 10.
Figure 12:
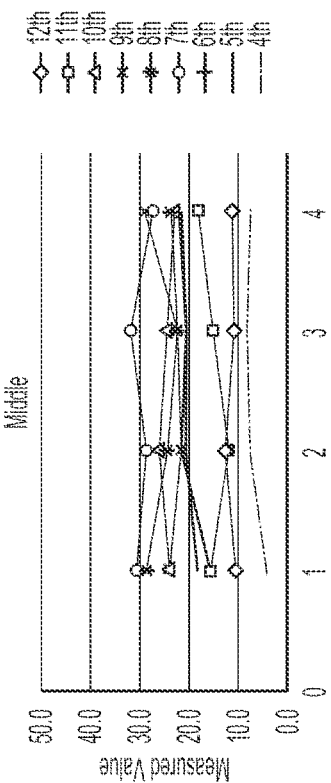
FIG. 12 is a chart showing imaging results obtained from the corn plant of FIG. 10.
Figure 13:
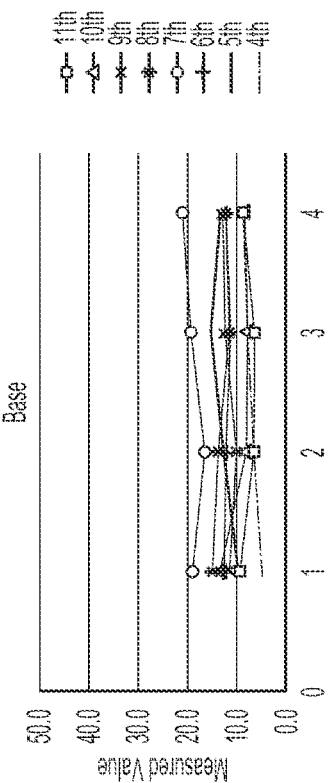
FIG. 13 is a chart showing imaging results obtained from the corn plant of FIG. 10.

FIGS. 11-13 illustrate the measurements acquired at regions of interest that correspond to FIG. 9 for most of the leaves of the plant depicted in FIG. 10. As can be seen in these figures, the chlorophyll content varies depending upon whether the region of interest is located near the tip (FIG. 11), near the middle (FIG. 12) or near the base (FIG. 13) of a particular leaf. As can also be seen in these figures, the chlorophyll content also varies depending upon the location of the leaf on the plant with the tip area showing the greatest variation between leaves and the base area of the leaf showing the least amount of variation. It is noted that the identification of which leaf on a plant a particular measurement corresponds to can be entered into the identification field associated with particular images by manually entering that data when initiating a scan for a particular leaf.

Figure 14:
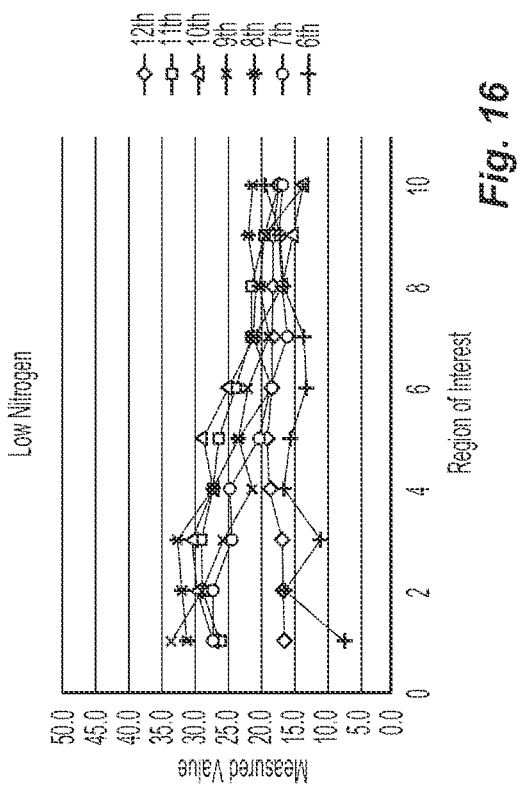
FIG. 14 is a chart showing imaging results obtained from a corn plant grown in soil with a high nitrogen content.
Figure 16:
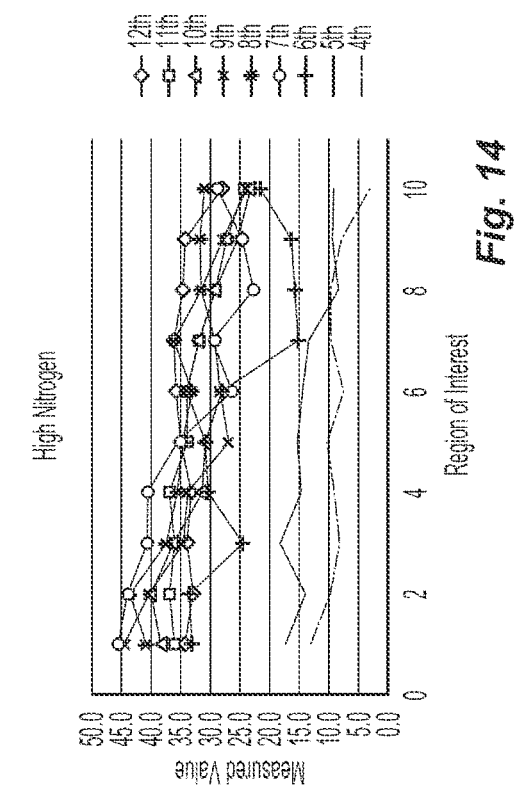
FIG. 16 is a chart showing imaging results obtained from a corn plant grown in soil with a low nitrogen content.
Figure 15:
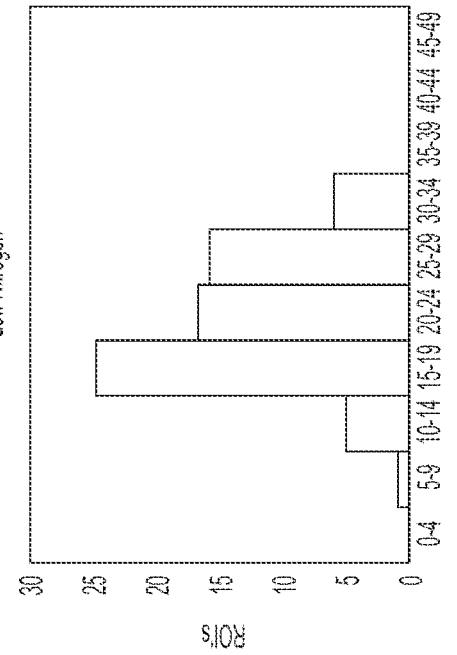
FIG. 15 is a histrogram of the data depicted in FIG. 14.
Figure 17:
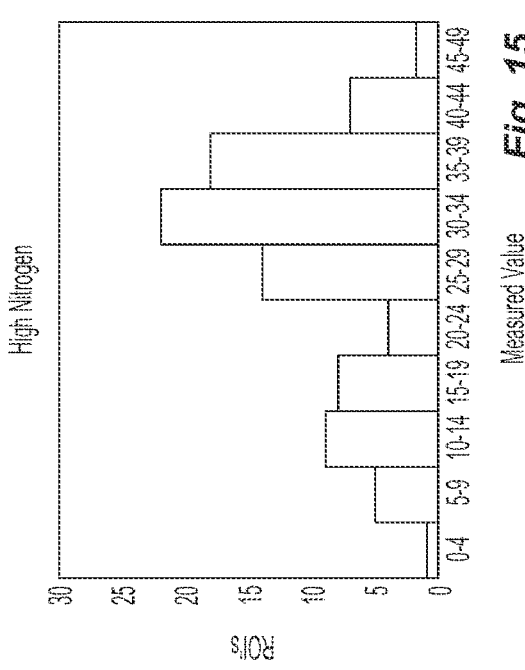
FIG. 17 is a histrogram of the data depicted in FIG. 16.
Figure 21:
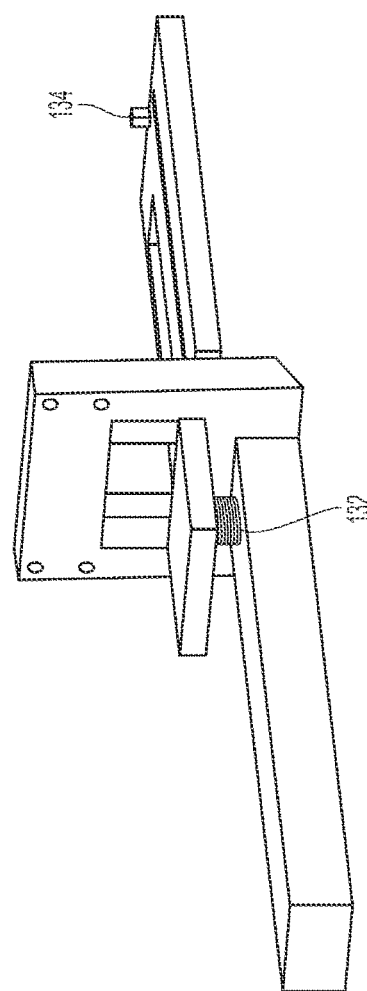
FIG. 21 a partial perspective schematic view of the assembly of FIG. 19.
Figure 20:
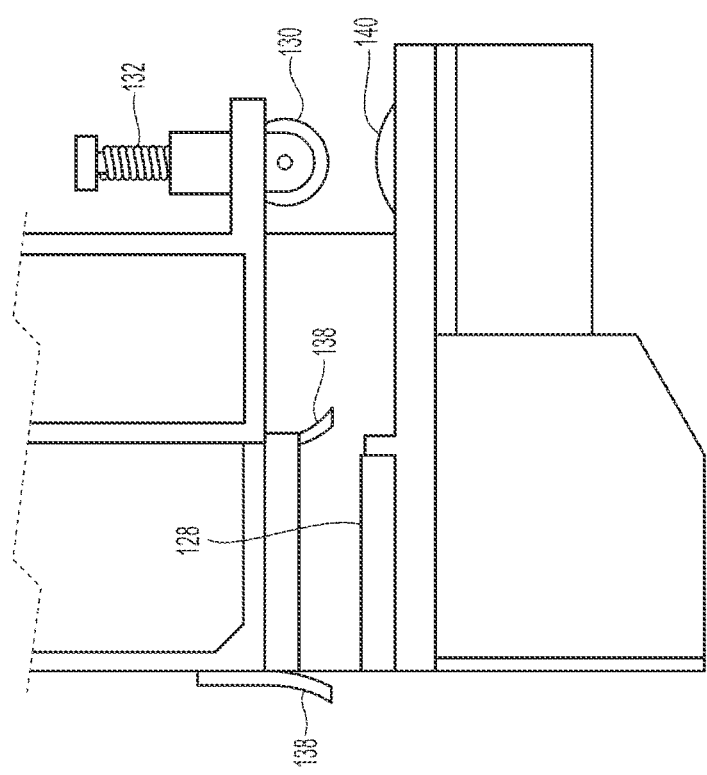
FIG. 20 is another partial schematic view of the assembly of FIG. 19.

FIGS. 14 and 15 display data acquired from the leaves of a corn plant grown in soil having a high nitrogen content while FIGS. 16 and 17 display data acquired from the leaves of a corn plant grown in soil having a low nitrogen content. The regions of interest for the data displayed in FIGS. 14-17 correspond to those depicted in FIG. 8 where a linear strip of regions of interest extend along the length of the leaf and laterally offset from the center rib.

As evident from these figures, and the histograms of FIGS. 15 and 17 in particular, patterns in the data can be used to distinguish between high and low nitrogen plants. Such patterns would not be present if a single spot measurement or a single averaged measurement for each plant or each leaf were used to compare the plants. Thus, it is evident from these data representations that pairing imaging analysis results with locational data concerning provides value and information beyond that provided by spot measurements and averaged values.

Figure 31:
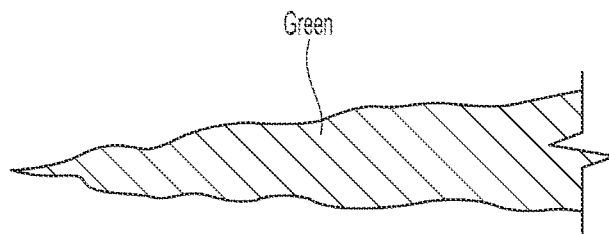
FIG. 31 is a top view of a healthy corn leaf.
Figure 32:
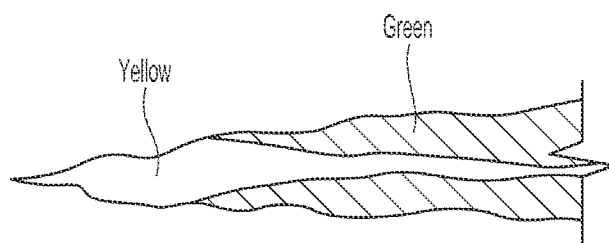
FIG. 32 is a top view of a corn leaf suffering from nitrogen hunger.
Figure 33:
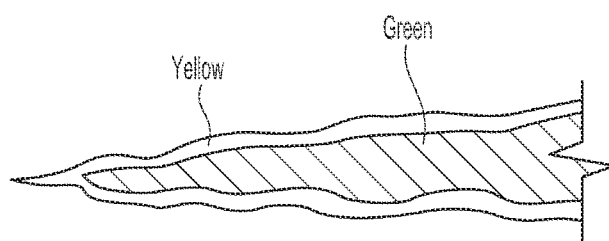
FIG. 33 is a top view of a corn leaf suffering from potash deficiency.

FIGS. 31-33 provide a further illustration of how positional information about individual regions of interest can be useful when analyzing plant health. FIG. 31 represents a leaf from a healthy corn plant wherein the entire leaf has a rich, dark, green color. FIG. 32 represents a leaf from a corn plant suffering nitrogen hunger wherein the outer edges of the leaf are green but the central part of the leaf beginning at the tip is yellowing. FIG. 33 represents a leaf from a corn plant suffering potash deficiency wherein the central portion of the leaf is green but the tip and outer edges of a lower leaf are yellowing. Taking a plurality of measurements at different regions of interest on the leaves depicted in FIGS. 31-33 and averaging those values for each leaf would be able to distinguish the healthy leaf from the other two leaves. Averaged values may not, however, be sufficient to distinguish the leaf suffering from nitrogen hunger from that suffering from potash deficiency. Associating locational data with the imaging data, however, does provide a means for making such a distinction.

In this regard, it is noted that Normalized Difference Vegetation Index (NDVI) is a commonly used remote sensing technique that identifies vegetation and measures the overall health of a plant. NDVI has been the used in the agricultural industry for many years. For example, it is known to use a portable device from the Soil-Plant Analyses Development (SPAD) unit of Minolta Camera Co. of Japan such as the SPAD-052, commonly referred to as a SPAD meter, to measure chlorophyll content of a leaf. The process typically involves randomly selecting sampling points on the first collar leaf of a plant. However, because such spot measures exhibit a high variability, an average value of multiple measurements are typically used.

Near infrared technologies may be capable of capturing an image of an entire leaf for analysis. However, it is conventional to calculate the NDVI for each pixel of such images and then use the average NDVI to evaluate the health of the plant.

One method for employing the locational information obtained with the apparatus of FIGS. 18-23, is to calculate a modified NDVI index by using a convolution integration method. A convolution vector or matrix is used to multiply the original NDVI vector or matrix to accentuate the impact of the variance in values by location on the leaf.

Machine learning can be employed to calculate the convolution vector or matrix. For example, samples of leaves from a high nitrogen soil (40 mM nitrogen, i.e., 40 millimolar which corresponds to well-fertilized plants), medium nitrogen soil (i.e., 3 mM nitrogen, which corresponds to moderate nitrogen stress) and low nitrogen soil (i.e., 1 mM nitrogen, which corresponds to severe nitrogen stress where the plants are barely alive) can be employed with machine learning to calculate the convolution vector or index. For example, a sample data table which includes positional information and has a size of m×n could be multiplied by a convolution mask vector having a size of n×1 to obtain a modified NDVI index having a size of m×1 wherein m is the sample size and n is the number of features.

The resulting modified NDVI index showed a greater difference between the high, medium and low nitrogen samples than the averaged NDVI values.

Figure 25:
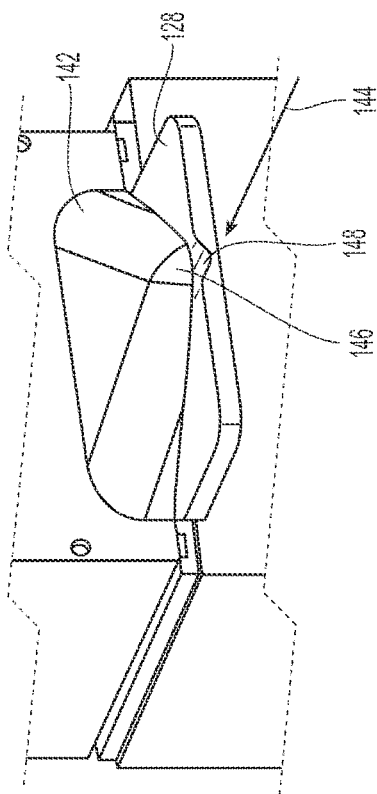
FIG. 25 is a perspective view of a wedge-shaped member for unfurling leaves.
Figure 26:
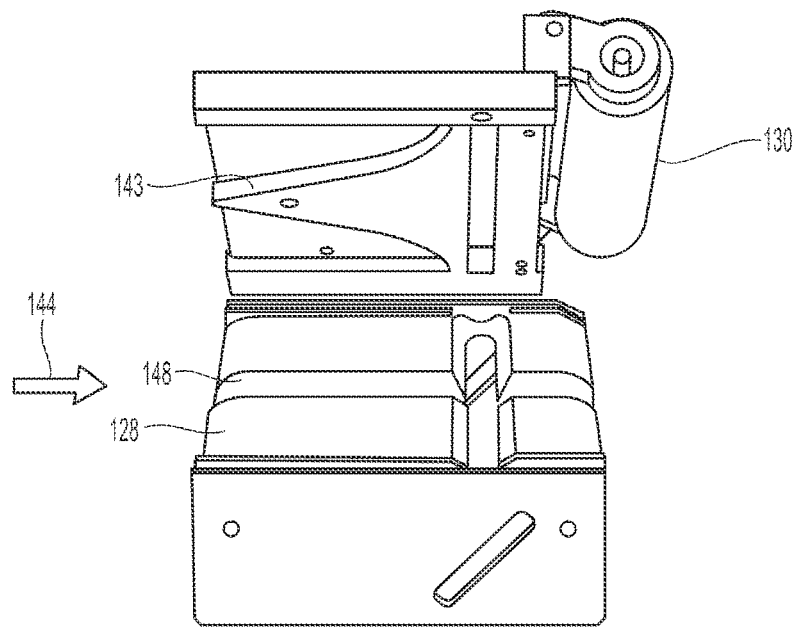
FIG. 26 is a perspective view of another wedge-shaped member for unfurling leaves.

FIGS. 25 and 26 illustrate further features of the apparatus that enhance the ability of the apparatus to move the plant specimen and obtain positional information. These features are particularly useful when using apparatus 100 to assess the condition of leaves from a corn plant.

The edges of a corn leaf may curl inwardly toward the center or mid-rib of the leaf particularly if the leaf has a low moisture content. As can be seen in FIG. 25, a wedge-shaped engagement member 142 can be positioned upstream of the drive member 130 to unfurl the leaves before acquiring images. The plant specimen is positioned between the wedge-shaped member 142 and specimen support surface 128 and engages wedge-shaped member 142 before the plant specimen engages drive member 130 when moving in the travel direction 144 of the plant specimen. Wedge-shaped member 142 has a narrower end 146 pointing way from drive member 130 whereby the wedge-shaped engagement member 142 unfurls the plant specimen as it moves in the travel direction 144. FIG. 26 illustrates an alternative wedge-shaped member 143 that is formed by a projection on a top cover member that is positioned opposite surface 128.

As can be seen in FIGS. 25 and 26, specimen support surface 128 may also include a linear groove 148 extending in the same direction as travel direction 144. Corn leaves, and leaves from many other plants, have a sizable central or mid-rib that extends the length of the leaf. Groove 148 receives the mid-rib and thereby facilitates the sliding movement of the leaf along surface 128 in a straight direction and without compression damage.

Figure 24:
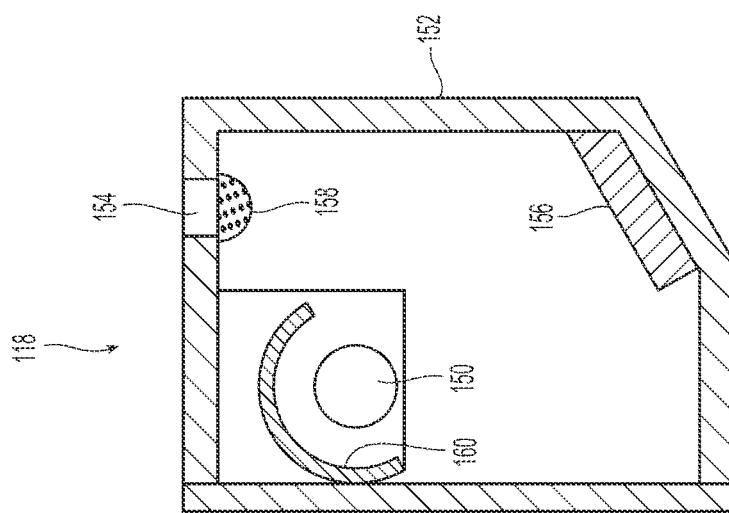
FIG. 24 is a schematic view of a light enclosure assembly.

FIG. 24 illustrates a light enclosure assembly 118 that can act as a light emitter for an apparatus disclosed herein. The light enclosure assembly 118 illustrated in FIG. 24 includes a light source 150 positioned within an enclosure structure 152. Enclosure 152 defines an opening 154 through which light from light source 150 is emitted. Enclosure 152 is positioned so that the light emitted through opening 154 is incident upon the plant specimen and sensible by image sensor 104.

The embodiment illustrated in FIG. 24 includes a diffuser 156 positioned to diffuse light within the enclosure and an emitter lens 158 positioned to gather diffuse light from within the enclosure and direct it outwardly from enclosure 152 through opening 154. Lens 158 takes the form of a cylindrical lens in the illustrated embodiment. A reflector 160 is positioned to reflect direct light from light source 150 toward diffuser 156. The use of such a diffuser provides more uniform light. Opening 154 may take the form of an elongate slit having a length substantially greater than its width whereby it generates light that falls incident on the plant specimen in a similar thin elongate shape.

Figure 27:
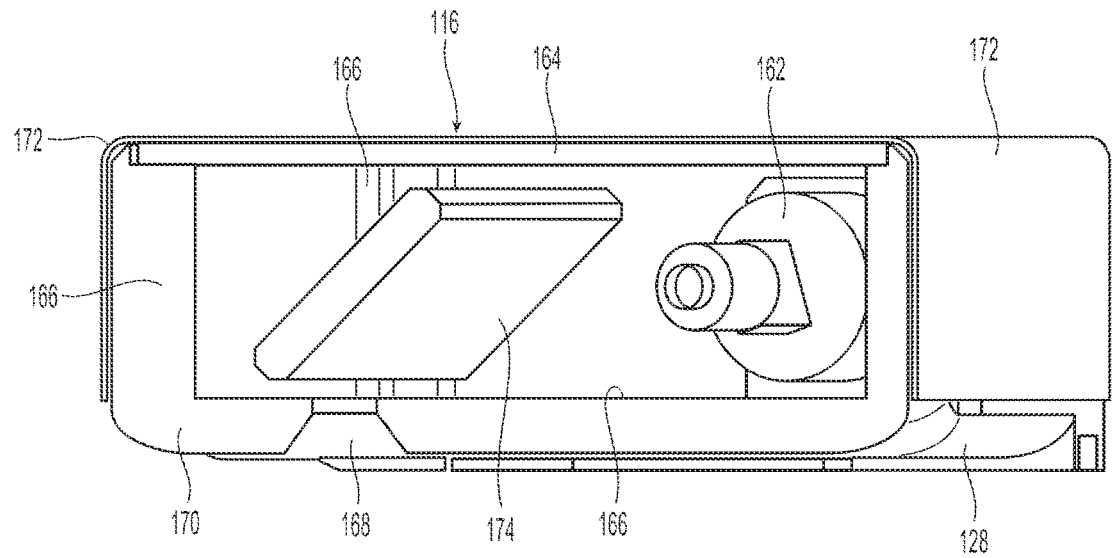
FIG. 27 is a schematic view of a light enclosure assembly.

FIG. 27 illustrates a light enclosure 116 which utilizes a halogen lamp 162 as a light source disposed within an enclosure structure 164. Halogen lamps generate considerable heat and such heat can present difficulties. A layer or solid panel of polytetrafluoroethylene (PTFE) or material including PTFE, which is commercially available under the trademark Teflon, is used to form the interior surfaces 166 of enclosure 164 that are subject to light emitted from halogen lamp 162 to minimize issues related to the generation of heat by lamp 162. Light from halogen lamp 162 is emitted through an opening 168 defined by enclosure 164. Opening 168 may be an elongate slit having a length substantially greater than its width. Use of elongate opening 168 confines the emission of light from halogen lamp 162 so that it is incident on an area of the plant specimen that generally corresponds to the size and shape of opening 168. A panel with a PTFE surface 174 is advantageously positioned within enclosure 164 to reflect light toward opening 168. In the illustrated embodiment, the entire panel forming surface 174 is formed out of PTFE.

In the embodiment depicted in FIG. 27, each of the panels used to form enclosure structure 164 is formed out of PTFE and with a metal cladding layer 172 being disposed on the exterior surface of the PTFE panels on one or more sides of the enclosure. In the depicted embodiment, the PTFE panel 170 which defines opening 168 has an inwardly facing surface 166 and an outwardly facing surface on the opposite side of panel 170 that forms specimen support surface 128. Metal cladding 172 is used to cover all of the exterior surfaces of enclosure structure 164 except for the exterior surface which forms specimen support surface 128. In the illustrated embodiment, cladding 172 is an aluminum material.

Panel 170 not only defines a slit 168 which extends entirely through the thickness of the panel but also defines a groove 148 that does not extend through the full thickness of the panel and which is located on specimen support surface 128. Elongate slit 168 has a length substantially greater than its width with the length of the slit extending in a direction perpendicular to travel direction 144 while linear groove 148 extends in travel direction 144 and is adapted to receive a central rib of a leaf.

Figure 28:
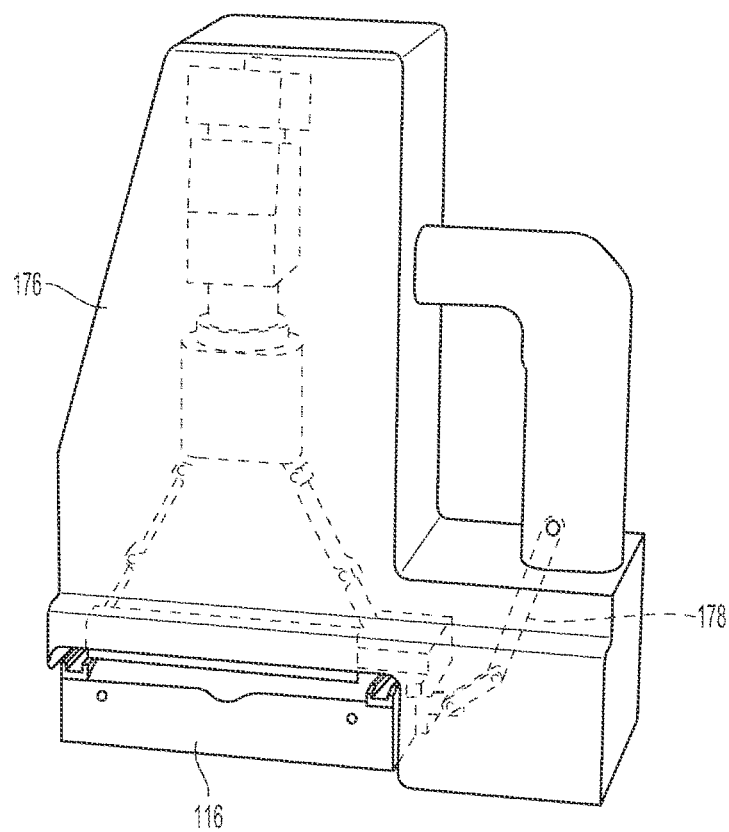
FIG. 28 is a perspective view of an alternative apparatus.

FIG. 28 illustrates an apparatus which includes a light enclosure assembly 116 that can be repositioned within housing assembly 176 with linkage assembly 178. A servo motor (not shown) can be used to rotate an upper member of linkage assembly 178 to thereby slide enclosure 116. By using an elongate slit 168 with a moveable enclosure 116 it would be possible to provide a means for obtaining images at a series of spaced apart regions of interest as depicted in FIGS. 8 and 9.

Figure 29:
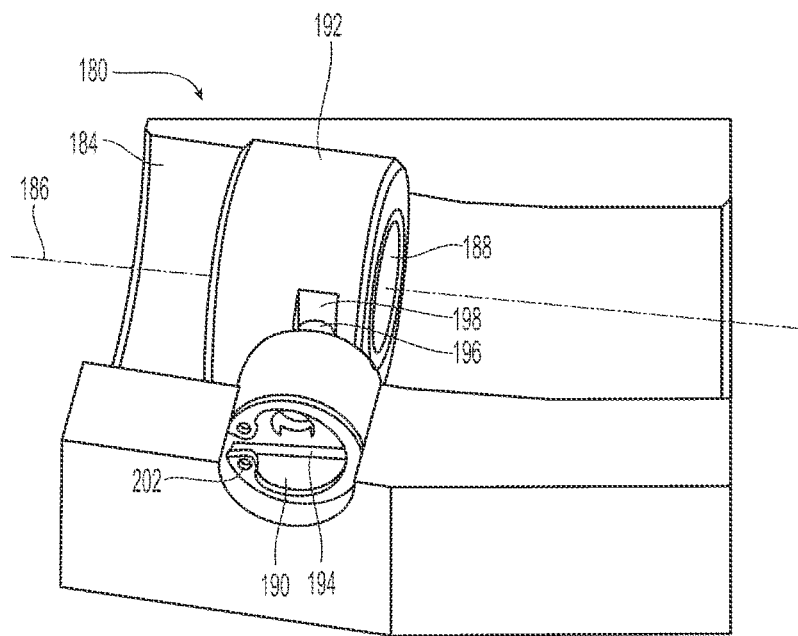
FIG. 29 is a cut-aw ay perspective view of a focusing assembly.

In some embodiments, it may be desirable to provide a mechanism for focusing one or more of the lens which are located in the optical path between the light emitter and the image sensor. If a conventional digital camera is adapted for use with the apparatus, the lens positioned immediately proximate the image sensor may include a focusing mechanism that is provided with the camera assembly. If such a focusing arrangement is not provided as part of a digital camera assembly and/or to focus another lens employed in the apparatus, a focusing assembly 180 as depicted in FIG. 29 can be employed with the lens.

Focusing assembly 180 includes a lens holder 182 which defines a passageway 184 in the form of a cylindrical bore. Optical path 186 extends through passageway 184 and through a lens 188 disposed therein. An adjustment member 190 engages a collar 192 in which lens 188 is secured. Member 190 has a user-interface 194 on the exterior surface of the apparatus in the form of a slot that can be engaged with a flat head screw driver to rotate member 190. Member 190 also has an off-center post 196 that engages a slot 198 in collar 192. As member 190 is rotated, post 196 causes collar 192 and lens 188 mounted therein to move along optical path 186 in passageway 184 to thereby focus lens 188. A snap ring 202 maintains member 190 within holder 182. This arrangement allows a user to focus lens 188 from the exterior of the apparatus with only a screw driver. Alternatively, a feature on member 190 that can be grasped by the hand of a user could be employed. The use of slot 198, however, helps to prevent inadvertent movement of member 190.

As discussed above, by providing the apparatus with an array of LEDs, the selective activation of such LEDs either alone or in combination with other light sources can be used to acquire images of the plant specimen under a plurality of different lighting conditions with the image sensor, including hyperspectral images and images wherein the light incident on the plant specimen is within a predefined wavelength band. By providing LEDs which emit light at different wavelengths, the LEDs can be selectively actuated to generate a plurality of different predefined wavelength bands whereby images can be acquired at each of the plurality of different predefined wavelength bands. For example, LEDs emitting light in the red, yellow and green wavelength band could each be separate actuated to acquire different images of a specimen.

Figure 30:
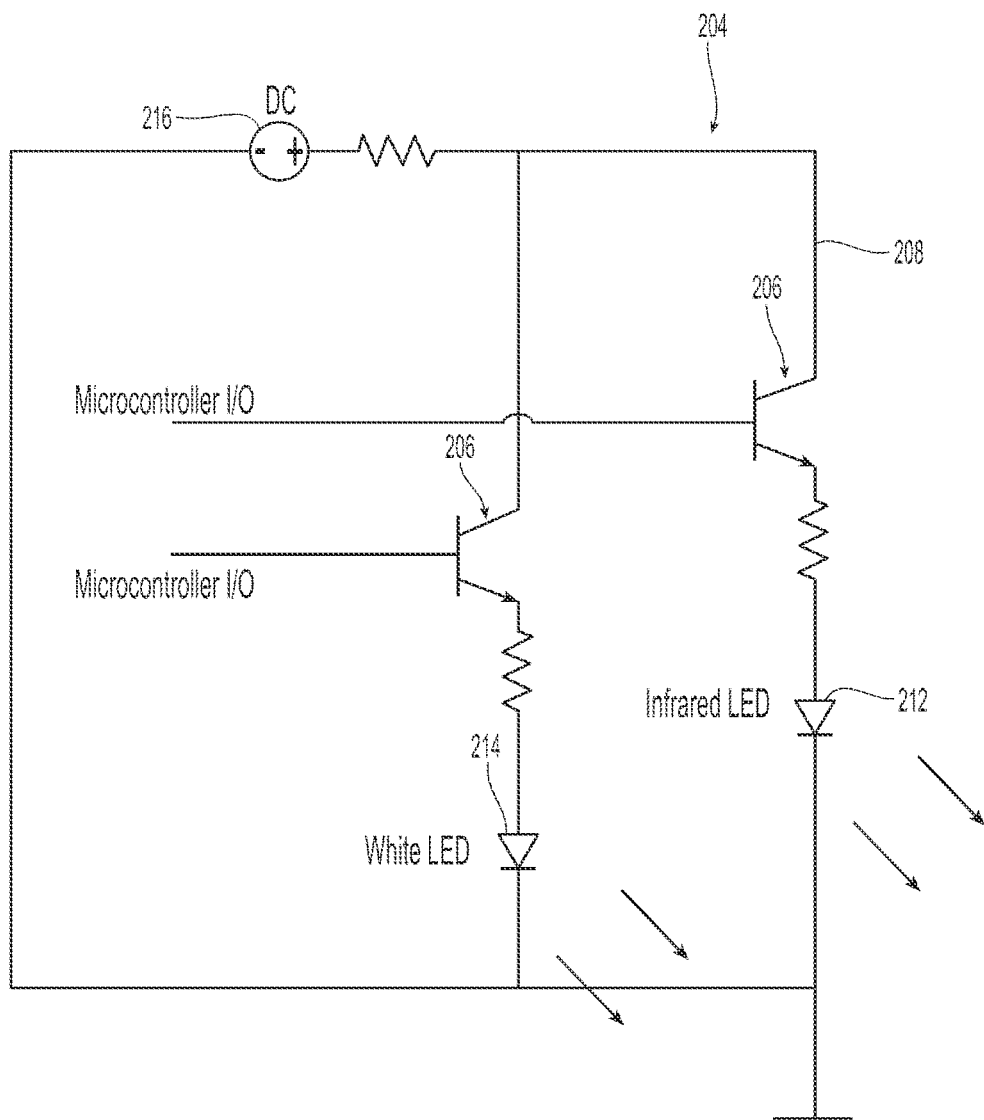
FIG. 30 is a schematic view of an LED switching circuit.

While the actuation of such different groups of LEDs can be accomplished with the controller 120 or processor 66 alone, FIG. 30 provides an example of a dedicated circuit that provides for a more rapid switching between groups of LEDs to thereby speed up the acquisition of multiple images under different lighting conditions. Circuit 204 is an LED switching circuit that includes a plurality of parallel branches 208, 210, wherein each branch includes an NPN transistor 206. Each branch controls a portion of the plurality of LEDs wherein each portion of the plurality of LEDs controlled by a separate branch defines a predefined wavelength band. In the example of FIG. 30, branch 208 controls LED 212 which emits infrared light and branch 210 controls LED 210 which emits white light. A power source 216 provides the electrical energy for the LEDs and controller 120 controls the operation of NPN transistors 206.

While one example of such a circuit has been illustrated in FIG. 30, such a circuit may include additional parallel branches to thereby control a greater number of different groups of LEDs emitting light at different wavelength bands. For example, in some embodiments, the plurality of LEDs include blue LEDs emitting light with a wavelength within the range of 350 to 480 nm with the blue LEDs being illuminated with a halogen light source for hyperspectral imaging of the plant specimen and the blue LEDs being the sole source of incident light for acquiring a fluorescent image of the plant specimen at a predefined wavelength band. Such an embodiment may also include non-blue LEDs generating light outside the range of 350 to 480 nm with the non-blue LEDs being used to acquire fluorescent images of the plant specimen at one or more predefined wavelength bands outside the range of 350 to 480 nm.

While this invention has been described as having an exemplary design, the present invention may be further modified within the spirit and scope of this disclosure. This application is therefore intended to cover any variations, uses, or adaptations of the invention using its general principles.

The invention claimed is:

1. A method for analyzing a plant specimen, comprising:
emitting light by at least one light emitter positioned to emit light within a sensing volume within a housing assembly when the housing assembly is in a closed configuration, the at least one light emitter comprising a first halogen light source, a second halogen light source, a laser light source, and a light emitting diode (LED) array, wherein the housing assembly controls entry of ambient light into the sensing volume when in the housing assembly in the closed configuration;
supporting a plant specimen by a specimen support coupled with the housing assembly wherein the specimen support configured to position the plant specimen within the sensing volume whereby light emitted from the at least one light emitter is incident upon the plant specimen when the housing assembly is in the closed configuration;
sensing light by an image sensor positioned within the sensing volume, light emitted from the at least one light emitter and configured to be incident on the plant specimen; and
controlling light emitted by the at least one light emitter;
capturing image data by the image sensor;
assessing one or more properties of the plant specimen from the captured image data captured;
positioning the specimen support between the image sensor and a first halogen light source;
capturing a hyperspectral transmittance image by the image sensor from light transmitted through the plant specimen which has been emitted from the first halogen light source; and
capturing a hyperspectral reflectance image and a fluorescent image from light emitted from at least one of a second halogen light source, the laser light source and the LED array and reflected by the plant specimen, when the second halogen light source, the laser light source and the LED array are positioned between the specimen support and the image sensor.

2. The method of claim 1, wherein capturing image data by the image sensor is under a plurality of different lighting conditions.

3. The method of claim 2, wherein the laser light source is configured to emit light in the range of 400 to 410 nm.

4. The method of claim 2, wherein the LED array is configured to emit emitting light within the range of 350 to 480 nm.

5. The method of claim 2 the laser light source is configured to emit light in the range of 400 to 410 nm and an LED array is configured to emit light within the range of 350 to 480 nm.

6. The method of claim 1, wherein the captured hyperspectral reflectance image, the captured hyperspectral transmittance image and further capturing a fluorescent image of a region of interest on the plant specimen are provided in a single imaging sequence.

7. The method of claim 1, wherein the image sensor is a CMOS sensor or a CCD sensor.

8. The method of claim 1, wherein the specimen support, the at least one light emitter and the image sensor are all fixed relative to the housing assembly when the housing assembly is in the closed configuration.

9. The method of claim 8, wherein the housing assembly includes a main body section and a pivotal section wherein the pivotal section pivots relative to the main body between an open position providing access to the sensing volume and a closed position.

10. The method of claim 1 wherein the at least one light emitter includes a light enclosure assembly, the light enclosure assembly comprising a light source disposed within an enclosure wherein the enclosure defines an opening through which light from the light source is emittable from the light enclosure assembly and wherein the light enclosure assembly is positionable whereby the light emitted through the opening is incident upon the plant specimen and sensible by the image sensor.

* * * * *